United States Patent [19]

Crum et al.

[11] 4,265,858
[45] May 5, 1981

[54] METERING AND MIXING APPARATUS FOR MULTIPLE COMPONENT

[75] Inventors: Gerald W. Crum, Elyria; Lawrence J. Macartney, Lorain, both of Ohio

[73] Assignee: Nordson Corporation, Amherst, Ohio

[21] Appl. No.: 672,239

[22] Filed: Mar. 31, 1976

[51] Int. Cl.³ .................. B01J 14/00; G05D 11/02
[52] U.S. Cl. ........................... 422/129; 137/99; 92/110; 92/111; 222/144.5; 239/112; 239/124; 239/304; 239/412; 366/152; 366/159; 366/161; 417/392; 417/429; 422/133; 425/200
[58] Field of Search ................ 23/252 R, 253 A; 137/625.18, 606, 625.49, 99; 259/7, 8, 98, 95; 417/429, 435, 426, 392, 29; 425/812, 4 R, 4 C, 146, 200; 264/37, 39, 40.7; 422/131, 133, 129; 92/110, 111; 222/144.5, 134, 135, 318, 334; 366/132, 138, 152, 159, 160, 161; 239/112, 124, 127, 304, 305, 407, 412

[56] References Cited

U.S. PATENT DOCUMENTS

| 2,431,058 | 11/1947 | Manning | 23/252 R X |
|---|---|---|---|
| 2,904,830 | 9/1959 | Mulrooney, Jr. | 425/812 X |
| 2,905,361 | 9/1959 | Noall | 222/334 UX |
| 2,925,780 | 2/1960 | Tear | 417/429 X |
| 2,946,488 | 7/1960 | Kraft | 22/137 X |
| 3,071,293 | 1/1963 | Lewis-Smith et al. | 222/389 X |
| 3,116,852 | 1/1964 | Anderson | 417/429 X |
| 3,224,642 | 12/1965 | De Martelaere et al. | 222/134 |
| 3,279,376 | 10/1966 | Hart | 417/429 |
| 3,485,418 | 12/1969 | Webster | 222/309 |
| 3,610,783 | 10/1971 | Croncher | 417/429 X |
| 3,618,171 | 11/1971 | Zecher | 425/200 |
| 3,716,191 | 2/1973 | Knight | 137/624.18 X |
| 3,791,631 | 2/1974 | Myer | 23/252 R X |
| 3,794,301 | 2/1974 | Simmonds, Jr. | 23/252 R X |
| 3,806,030 | 4/1974 | Svensson | 239/112 |
| 3,871,268 | 3/1975 | Misima | 417/429 X |
| 3,915,438 | 10/1975 | Neiley, Jr. et al. | 23/252 R X |
| 3,967,634 | 7/1976 | Scherer et al. | 222/135 X |

Primary Examiner—Arnold Turk
Attorney, Agent, or Firm—Wood, Herron & Evans

[57] ABSTRACT

A multiple component applicator system for simultaneously metering a plurality of flowable materials and for delivering the metered quantities in predetermined proportions to a mixing device wherein the flowable materials are mixed and then dispensed. The system includes an improved metering and proportioning device as well as an improved modular control system for facilitating rapid interchangeability of the flowable materials being dispensed from the apparatus.

8 Claims, 11 Drawing Figures

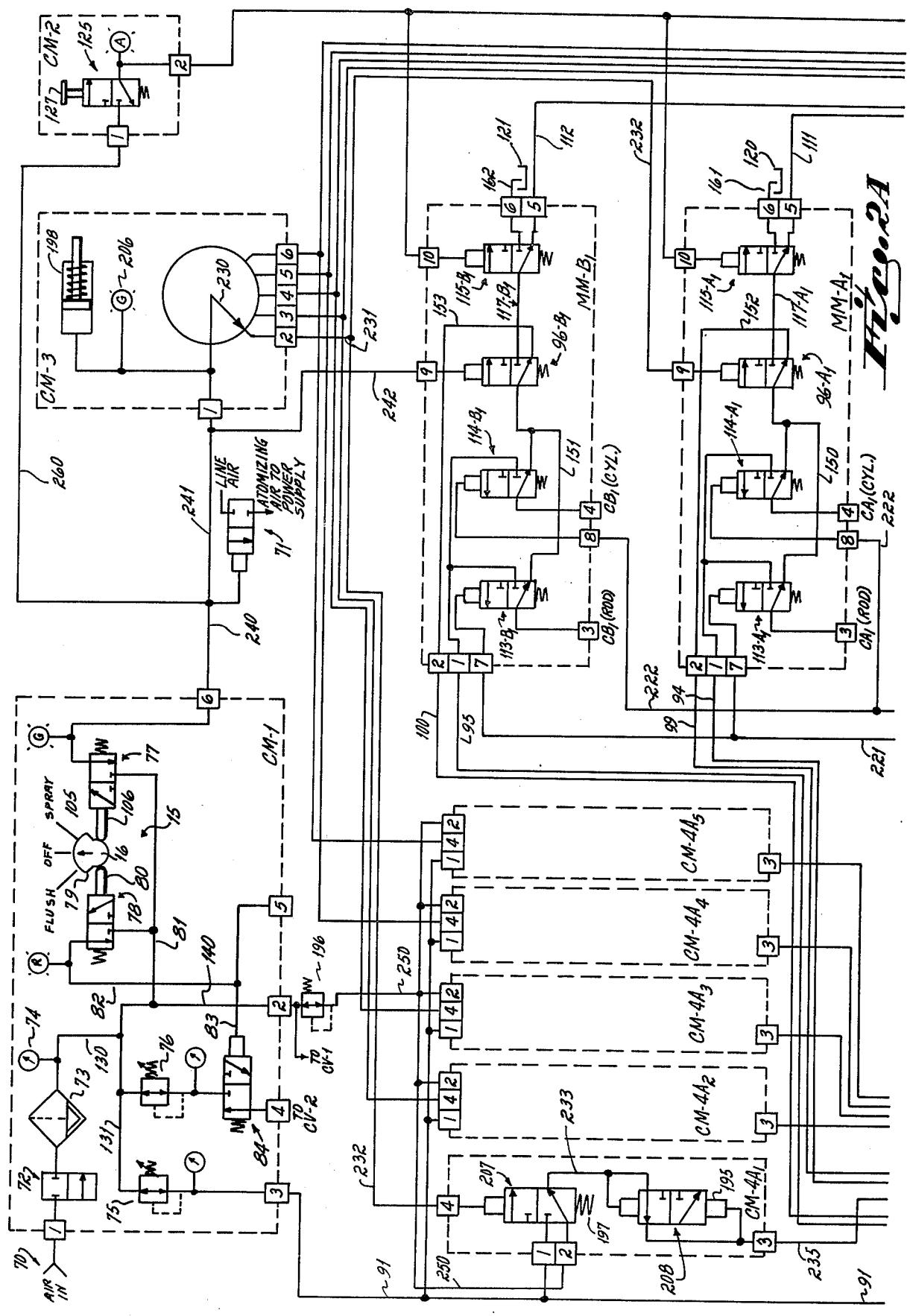

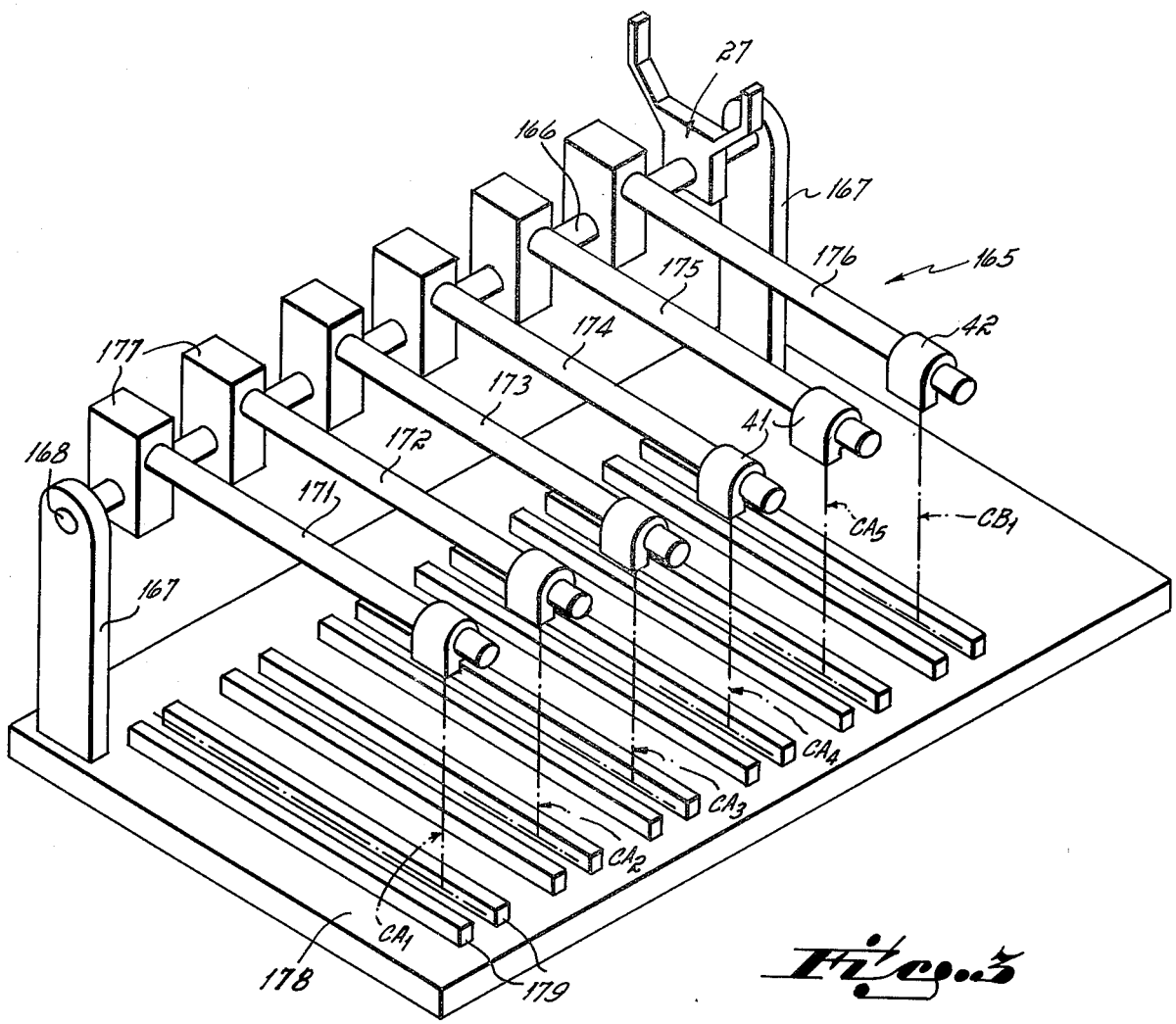
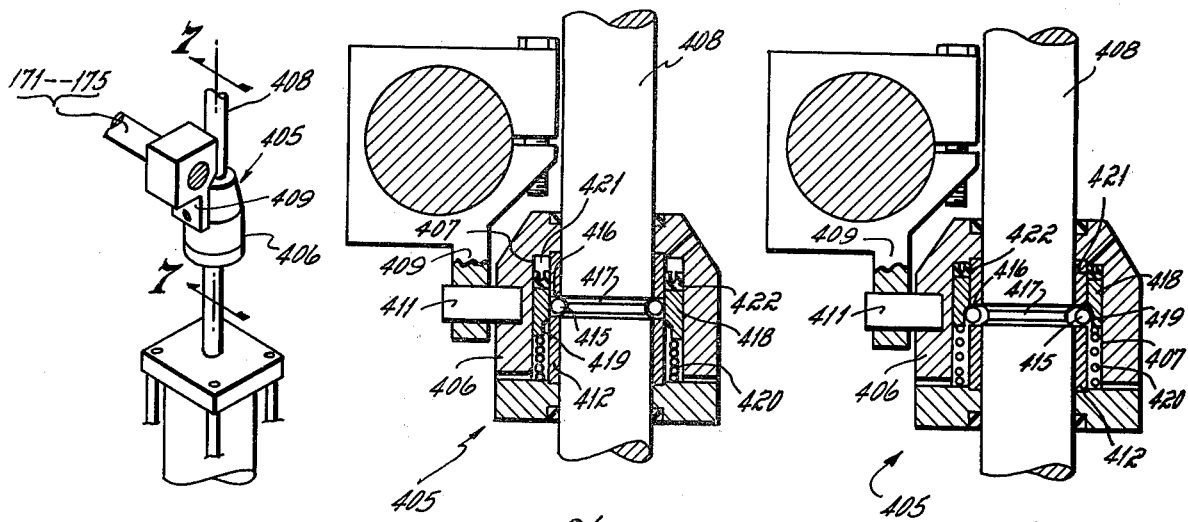

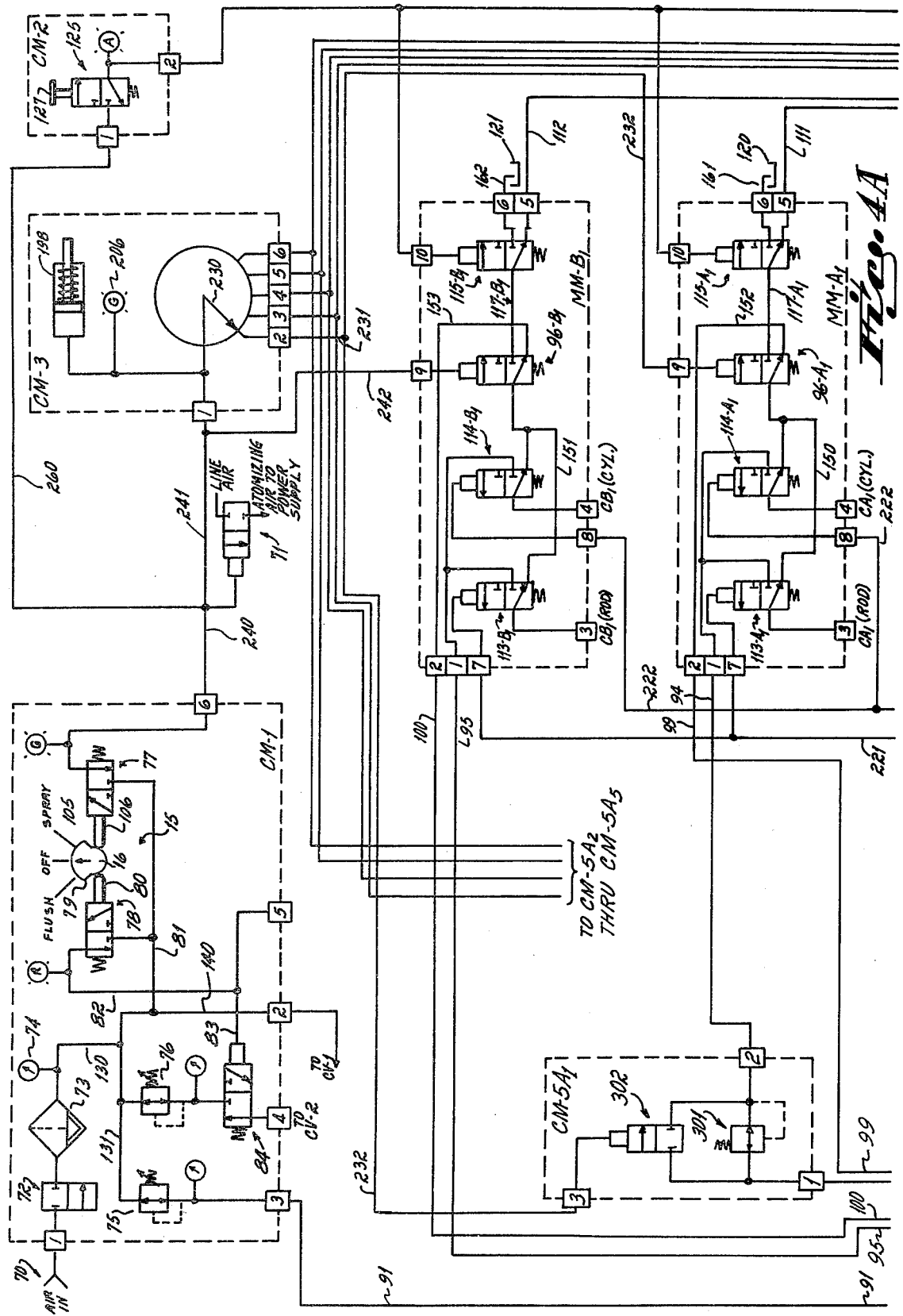

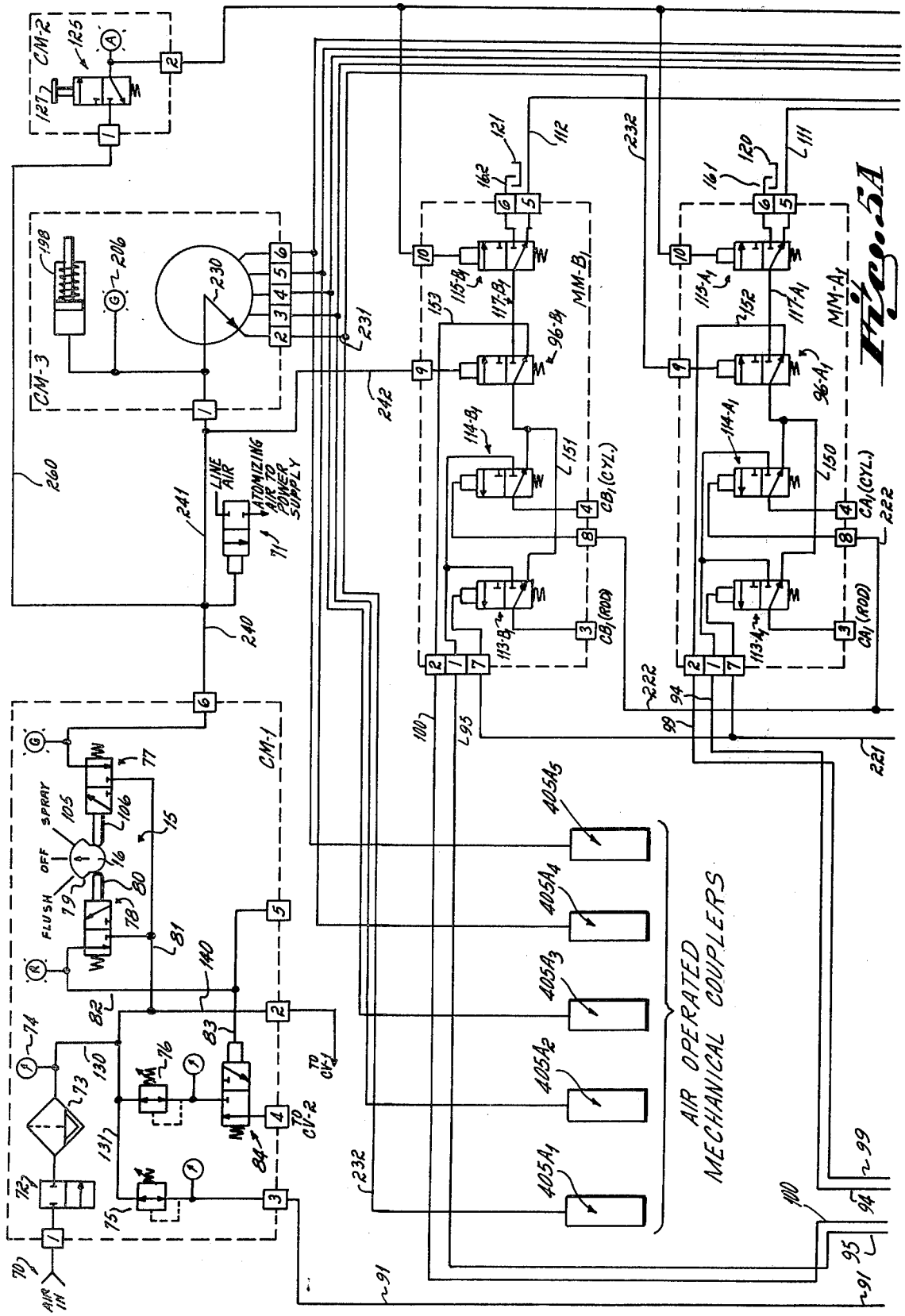

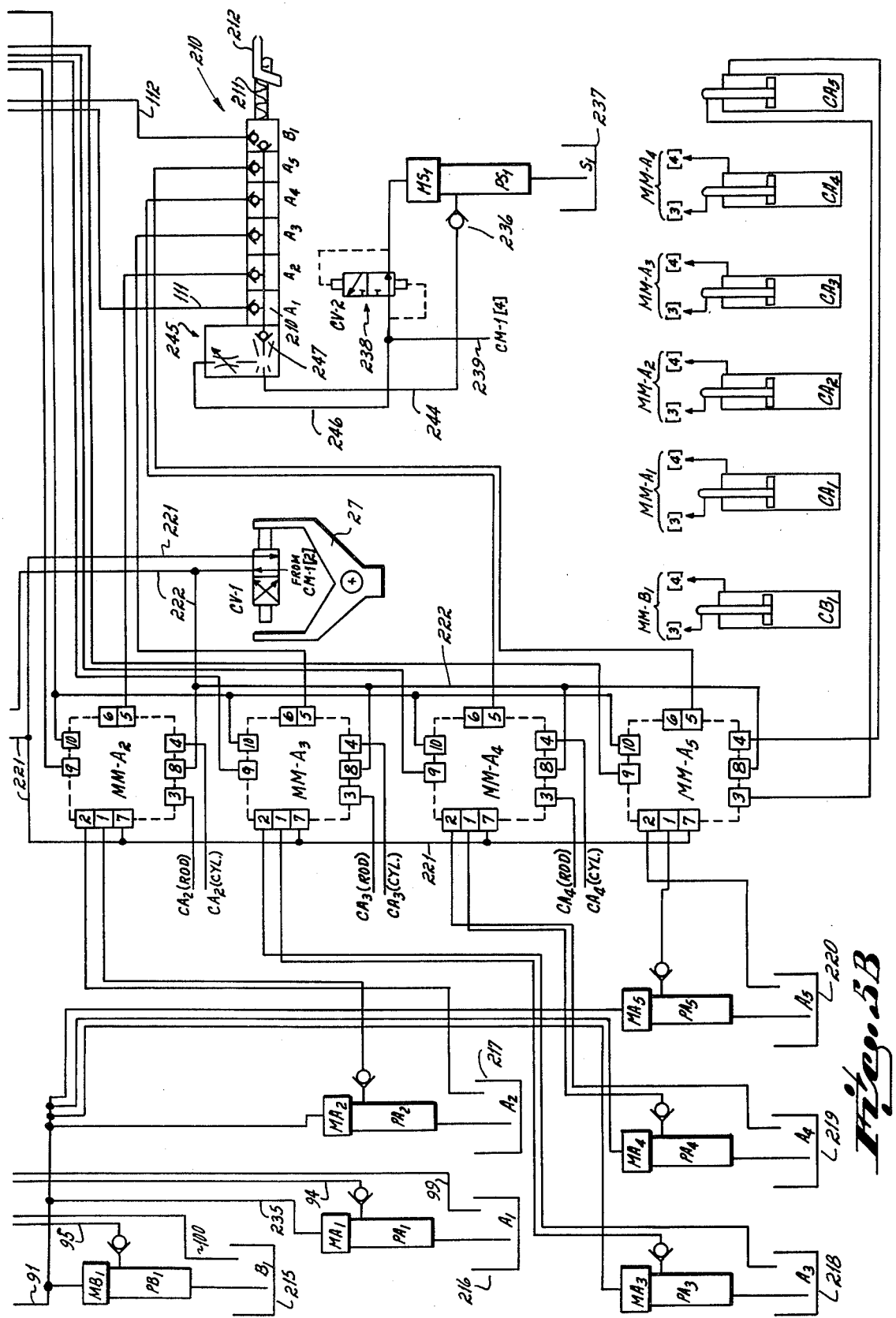

METERING AND MIXING APPARATUS FOR MULTIPLE COMPONENT

This invention relates to apparatus for mixing and dispensing liquids or flowable materials and particularly to apparatus for proportionally metering, mixing and dispensing base and co-reaction materials such as multiple component paints, adhesives, sealants, etc.

In many industries there has been a trend away from solvent base materials such as paints, lacquers, adhesives, etc. in an effort to eliminate or materially reduce the quantity of solvents released to the atmosphere during curing. One direction in which industry has turned in this effort has been toward toward two component paints, lacquers, or adhesives in which the individual components are maintained separate through a metering process and only mixed and reacted immediately prior to application. This type of two component system has though suffered from lack of commercially available equipment for its application. Particularly it has suffered for lack of available application equipment in cases where multiple component paints of varying colors are interchangeably applied through the same equipment, as for example, in the automobile and appliance industries.

To interchangeably vary colors or materials some provision must be made for completely purging one color or material from the common equipment before initiating application of the next following color. That purge must be made with a minimum loss of paint and time if the application equipment is to be commercially acceptable. It is for lack of such quick color change equipment that two component paint systems have heretofore particularly suffered.

It has therefore been one objective of this invention to provide improved application equipment for applying two component systems.

Still another objective of this invention has been to provide improved application equipment for interchangeably applying multiple two component systems.

The equipment or apparatus which accomplishes these objectives comprises a plurality of transfer pumps, each of which is operative to pump one component material to a metering device. Each metering device is operative to accurately meter and supply to a common mixing device a predetermined quantity of each material, which quantity bears a very specific proportional relationship to the other component material being simultaneously delivered to the mixing device. Selectivity of which components of a multiple component system are supplied to the mixing device is effected by a modular, pneumatic logic, hydraulic control system.

We have found that conventional metering devices which generally take the form of dual acting, hydraulic piston pumps are very accurate metering or proportioning devices but that they are relatively unstable and inaccurate at start-up. Such instability is troublesome and undesirable in two component paint or spray systems because the mixed materials must be accurately proportioned in order to obtain the desired physical properties of the mixed and cured components. Consequently, paint or material mixed during the period of instability must generally be discarded or wasted because of improper proportioning.

One aspect of this invention is predicated upon the discovery that the large wastage which attends instability at start-up of conventional double acting piston pump metering devices can be traced to air being entrapped on one side, usually the lower side, of the pump cylinder. Liquid is conventionally supplied to the opposite sides of the cylinder through ports located at or adjacent the opposite ends of the cylinder. If the cylinder is vertically oriented there is a tendency for air to become entrapped in the lower chamber of the cylinder adjacent the top of the piston. So long as this air remains so entrapped, the quantity of liquid pumped from the air containing chamber fluctuates or varies. Eventually, most of the entrapped air is pumped from the chamber but until this air is removed, flow from the pump remains variable.

We have discovered and another aspect of this invention is predicated upon the discovery that the metered flow from a double acting piston type pump may be very quickly stabilized if the pump cylinder is oriented vertically and the flow to and from the pump lower chamber is directed through the upwardly extending piston rod. By so porting the lower chamber and by porting the upper chamber through a port located at the top of the upper chamber, the flow from the metering pump is very quickly stabilized. In fact, we have determined that this improved porting of the metering pump generally results in stabilization of the pump within 1% of its ultimate stabilized condition after only three strokes of the piston.

Another aspect of this invention is predicated upon an improved multiple component metering and mixing apparatus which enables multiple base materials to be selectively combined with a common coreactant material in accurate predetermined proportions.

Another aspect of this invention is predicated upon an improved control circuit for selectively enabling different components to be metered and mixed by the apparatus. This improved control circuit comprises a pneumatic logic circuit operable in conjunction with conventional piloted three-way hydraulic valves to effect the control functions.

Still another aspect of this invention is predicated upon an improved modular multiple component metering and mixing apparatus which enables multiple different base materials, as for example polyols, to be selectively combined with a common coreactant, such as an isocyanate, in accurate predetermined proportions. Because the system is modular, additional base materials, as for example additional color paints, may be added to the system by simply adding additional modules without modification of the existing apparatus.

We have found that in the course of pumping one of a plurality of different base component materials or different color component materials via metering pumps which are interconnected by a common mechanical linkage, there is a problem with the unused or unselected metering pumps having a combined force loading effect upon the metering pump of the selected base component or color. This problem results from all of the interconnected metering pumps being driven by their respective external power sources while only one of the metering pumps, that of the selected base component or color supplies base component material to the spray gun. Unless the force inputs of the unused metering pump are isolated from the force input of the selected metering pump, force input from the unselected pumps will be added to the hydraulic force input of the selected base component. The result will be that of a pressure multiplier in which excessive liquid pressures are generated between the metering pump of the selected color or base component and the dispensing gun.

To relieve or isolate that force contribution of the unselected metering pumps from the downstream force input to the liquid flowing from the selected metering pump, we have in one embodiment reduced the force input to the unselected metering pumps via a pneumatic control of the air pressure used to drive the unselected color transfer pumps. In another embodiment we have achieved the same force isolation by hydraulic control of the liquid pressure supplied to the unselected transfer pumps. And in a third embodiment, this same force isolation of the unselected metering pumps has been achieved by mechanically decoupling the unselected metering pumps from the common linkage structure. In each instance, the net effect is one of reducing or eliminating any force input from the metering pumps of unselected base materials or colors from the force input of the metering pump of a selected base metering or color. And in each instance, there is no net force reduction taken from the selected metering pump and used to drive and overcome frictional forces of unselected metering pumps because in each mode of control, whether pneumatic, hydraulic or mechanical, the unselected metering pumps continue to be self-driven by their own respective power sources.

These and other objects and advantages of this invention will be more readily apparent from the following description of the drawings in which:

FIG. 1 is a partially diagrammatic illustration of a two component metering, mixing and dispensing apparatus incorporating the invention of this application.

FIGS. 2A and 2B together make up FIG. 2. FIG. 2 is a partially diagrammatic illustration of a two component metering, mixing and dispensing apparatus in which multiple different base components are interchangeably mixable with a single coreactant.

FIG. 3 is a perspective view of a metering device employed in the modification of the apparatus illustrated in FIG. 2.

FIGS. 4A and 4B together make up FIG. 4. FIG. 4 is a partially diagrammatic illustration of a second embodiment of a metering, mixing and dispensing apparatus for interchangeably mixing multiple different base components with a single coreactant material.

FIGS. 5A and 5B together make up FIG. 5. FIG. 5 is a partially diagrammatic illustration of a third embodiment of a metering, mixing and dispensing apparatus for interchangeably mixing multiple different base components with a single coreactant material.

FIG. 6 is a perspective view of the metering device employed in the modification of the apparatus illustrated in FIG. 5.

FIG. 7 is a cross sectional view of a pneumatic clutch employed in the embodiment of the apparatus taken on line 7—7 of FIG. 5.

FIG. 8 is a cross sectional view similar to FIG. 7 but illustrating the pneumatic clutch in a disengaged condition.

GENERAL OPERATION

Figure 1:
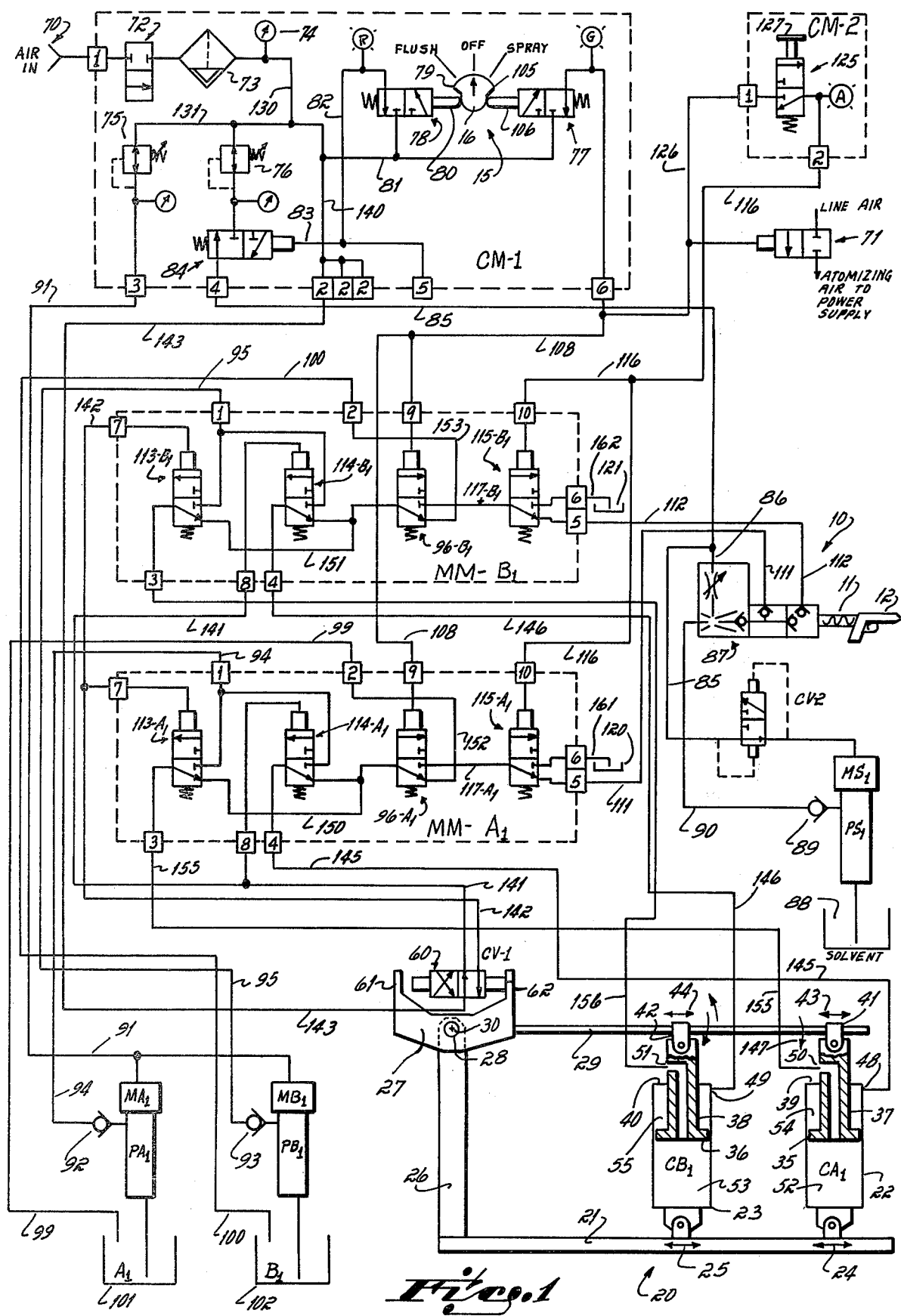

With reference first to FIG. 1, there is illustrated a modular system for effecting proportional metering, mixing and dispensing of two liquid or flowable component materials $A_1$ and $B_1$. The complete system is modular in form so that, as is explained more fully hereinafter in connection with the apparatus of FIG. 2, multiple different base materials may be added to the system and selectively proportionally metered, mixed and dispensed with the common coreactant $B_1$.

In general, the apparatus of FIG. 1 comprises a pneumatic logic control circuit for controlling hydraulic flow of the two components $A_1$ and $B_1$ through a hydraulic flow circuit. The pneumatic logic circuit comprises a pneumatic control module CM-1, a pair of manifold modules MM-$A_1$ and MM-$B_1$; a pneumatic control valve CV-1 and a sample control module CM-2. The hydraulic flow circuit comprises three pneumatically driven transfer pumps $PA_1$, $PB_1$ and $PS_1$, pilot operated flow control valves of the manifolds MM-$A_1$ and MM-$B_1$, a pair of metering pumps $CA_1$ and $CB_1$, a manifold 10, a mixing chamber 11, and a dispensing gun 12.

In general, air supplied to the pneumatic control module CM-1 is routed by that module to the base and coreactant transfer pumps $PA_1$ and $PB_1$, and in the "flush" mode of operation of the apparatus, to the solvent transfer pump $PS_1$. The choice of which pumps are operated is dependent upon the setting of a selector switch 15 contained within the control module CM-1.

When a knob 16 of the selector switch 15 is directed toward the "flush" indicia of the switch, the pneumatic control module CM-1 is operative to direct air to the pneumatic motor $MS_1$ of the solvent transfer pump $PS_1$ and to the other transfer pumps $PA_1$, $PB_1$ of the system. In this "flush" mode of operation of the apparatus, air pressure to the motors of the pump $PA_1$ and $PB_1$ causes the pumps to operate and pump the liquids $A_1$ and $B_1$ but the flow of those liquids in this "flush" mode is routed by the manifolds MM-$A_1$ and MM-$B_1$ back to the reservoirs 101 and 102. In the "flush" mode of operation, air pressure to the motor $MS_1$ of the solvent transfer pump $PS_1$ causes that motor to drive the pump $PS_1$ and force solvent through the manifold 10, mixer 11 and gun 12 to purge those elements of mixed components $A_1$ and $B_1$. In the absence of this solvent purging capacity, the mixed components would react and clog the manifold, mixer and gun.

When the knob 16 of the selector switch 15 is directed to the "spray" setting of the switch, the control module CM-1 is operative to direct air pressure from the control module CM-1 to the drive motors $MA_1$, $MB_1$ of the liquid component transfer pumps $PA_1$ and $PB_1$. The pneumatic drive motors $MA_1$, $MB_1$ of these pumps $PA_1$ and $PB_1$ then drive the pumps so as to supply component liquid materials $A_1$ and $B_1$ to the inlet ports [1] of the manifold modules MM-$A_1$ and MM-$B_1$ respectively. The manifolds in turn route the incoming component materials $A_1$, $B_1$ to the intake ports of the metering pumps $CA_1$, $CB_1$ respectively while simultaneously directing flow from the high pressure sides of the metering pumps $CA_1$, $CB_1$ to the manifold 10. At the end of each stroke of the metering pumps, a control valve CV-1 reverses the connection between the intake and pressure ports of the metering pump so that that port which had formerly been the intake port becomes the pressure port and vice versa. Consequently, the pressure side or chamber of the metering pump always remains connected to the manifold 10. At the manifold the pressurized component materials are mixed and forced through a conventional motionless radial mixer 11 such as that described in U.S. Pat. No. 3,286,992. In the course of passing through the mixer 11, the materials are thoroughly intermixed before being dispensed through a conventional gun 12, as for example a conventional atomized air spray gun.

METERING APPARATUS

The metering of proportional quantities of component materials $A_1$ and $B_1$ supplied to the manifold 10 and subsequently to the mixer 11 is controlled by a metering device indicated generally by the numeral 20. This metering device comprises a base 21 upon which a pair of metering pumps or metering cylinders 22, 23 as they are often called, are adjustably mounted for movement toward and away from a support post 26, as indicated by the arrows 24, 25.

The top of the support post 26 supports a generally U-shaped bracket 27 for pivotal movement about a pivot pin 28. A beam 29 extends outwardly from and is pivotally attached to the pivot 28. Because the beam is rigidly attached to the bracket, they are synchronously pivotable about the pivot pin 28 and an axis 30 of the pin.

Located within each of the cylinders 22, 23 is a piston 35, 36 from which a piston rod 37, 38 extends upwardly through the top wall 39, 40 of the cylinders. The upper ends of these piston rods 37, 38 are pivotally connected to U-shaped brackets 41, 42 which extend over and are adjustably secured to the beam 29 such that the brackets are adjustable longitudinally relative to the beam as indicated by the arrows 43, 44.

The cylinders 22, 23 of the metering device are ported through a pair of ports, one of which 48, 49 is located adjacent the top of the cylinder and the other 50, 51 of which extends upwardly through the piston rods 37, 38 from the underside of the piston. As a result of this porting the lower chambers 52, 53 of each cylinder 22, 23 are ported at the top through the piston and piston rod. The upper chambers 54, 55 are also ported at the top through ports 48, 49.

The two metering pumps $CA_1$, $CB_1$ both act as double acting hydraulic piston pumps. The "double acting" phrase refers to the fact that the pump functions to displace liquid under pressure from the pump cylinder during both strokes of the piston; that is, both when the piston moves upwardly and when it moves downwardly within the cylinder. The total quantity of liquid materials pumped from the two pumps $CA_1$, $CB_1$ is a function of the total vertical movement of the two piston rods of the pumps and of the piston diameters. In the illustrated embodiment the two pumps have the same displacement, i.e., the same size cylinder chambers and pistons but the metering pump $CA_1$ has a substantially longer stroke than the pump $CB_1$. These strokes are a function of the distance the cylinders 22, 23 are located from the vertical post 26. Since the two piston rods are mechanically interconnected by the beam 29, the two piston rods always stroke together and move a distance proportional to the distance of the cylinders 22, 23 from the post 26. By decreasing the distance of the cylinder 22 from the post 26 while maintaining the distance of the cylinder 23 fixed relative to the post, the quantity of liquid $A_1$ pumped from the pump $CA_1$ during a single stroke of the two pumps will be decreased relative to the quantity pumped by the metering pump $CB_1$. Alternatively, the relative quantity of material $A_1$ pumped from the pump $CA_1$ relative to the pump $CB_1$ may be increased by moving the pump $CA_1$ outwardly away from the post 26.

The two pumps $CB_1$ and $CA_1$ are both positioned with their axes located in a vertical plane. Consequently, both the lower chambers 52, 53 and upper chambers 54, 55 of the pumps are evacuated through ports located at the top of the respective chamber. We have found that this porting arrangement is very advantageous for evacuating air from both chambers of the pumps $CA_1$, $CB_1$ with a minimum waste of component liquid materials. Upon initial start-up of the apparatus there is always air entrapped in the two chambers. That air, so long as it remains in the chambers, results in erratic displacement of liquid from the air containing chamber. Consequently, until the air is completely removed, the proportions of component materials $A_1$, $B_1$ flowing from the pumps are unstable and unpredictable. By locating both ports though at the top of the two chambers where air contained within the chamber becomes entrapped, operation of the pumps results in the entrapped air being expelled after two or three strokes of the pump. In fact, in practice, we have found that porting of the lower chambers of the metering pumps $CA_1$, $CB_1$ upwardly through the piston and piston rods generally results in the two pumps being within 1% of completely stable pumping conditions after only three strokes of the pumps.

At the end of each stroke of the metering pumps $CA_1$, $CB_1$ the pistons 35, 36 are caused to reverse direction of movement by actuation of a mechanically actuated control valve CV-1 of the metering drive 20. This control valve comprises a conventional mechanically actuated four-way valve, the spool 60 of which is positioned by upstanding arms 61, 62 of the bracket 27. At the end of each stroke of the metering pumps $CA_1$, $CB_1$ one or the other of these two arms 61, 62 contacts the spool 60 and moves it to the other of its two positions so as to effect reversal of the piston movement, as is explained more fully hereinafter.

Alternatively, control valve CV-1 may be a conventional pneumatically actuated pilot operated four-way valve in which yoke 27 is operable to actuate pneumatic pilot valves. In this alternative, valve CV-1 may be located remote from the metering cylinders and their associated locating structure.

PNEUMATIC MODULE CM-1

Control of the apparatus of FIG. 1 is all pneumatic and includes the pneumatic control module CM-1 operable to route the incoming air from an air pressure source 70 to the component transfer pumps $PA_1$, $PB_1$, to the solvent transfer pump $PS_1$ and to the pneumatic logic manifolds $MM-B_1$, $MM-A_1$. The control module CM-1 also controls the flow of air pressure to the sample panel control module CM-2 as well as to a conventional power supply interlock 71 and to a dump valve (not shown) of the spray gun 12. The power supply interlock 71 is conventional in electrostatic spraying devices wherein the electrical power to the gun is only actuated when atomizing air is being supplied to the gun. This is a conventional safety feature on most electrostatic air spray systems. The dump valve (not shown) is an optional feature of spray guns, usually found on automatic actuated guns. The dump valve (not shown) of the spray gun 12 is a conventional pneumatic actuated valve located on the gun and operable to route solvent or solvent containing paint to a dump reservoir rather than dispensing it through the nozzle of the gun 12.

The pneumatic control module CM-1 comprises a conventional ball valve 72 by means of which the air supply to the module CM-1 is turned on and off. When in the "on" position, the ball valve 72 routes the incoming air through a conventional filter 73 and pressure gauge 74 to a pair of conventional pressure regulators 75 and 76 as well as to the selector switch 15 and to the control valve CV-1 of the metering device 20. So long as the ball valve is in the "on" position air passes through the regulator 75 through outlet port [3] of the control module CM-1 to the pneumatic drive motors MA$_1$, MB$_1$ of the transfer pumps PA$_1$, PB$_1$. Similarly, so long as the ball valve 72 is in the "on" position air is routed through the outlet port [2] of the control module CM-1 to the control valve CV-1. Air is similarly routed to the selector switch 15 so long as the ball valve 72 is in the "on" position, but the air pressure to the selector switch 15 is blocked at the switch by a pair of cam controlled three-way valves 77, 78 of the switch so long as the switch selector knob 16 is in the "off" position.

When knob 16 of the selector switch 15 is turned to the "flush" position a cam lobe 79 of the knob causes a mechanical actuator 80 of the three-way valve to be moved to a position in which air is supplied via line 81 through the valve 78 and then via lines 82 and 83 to a pilot operated three-way valve 84 of the control module CM-1. Simultaneously, air is supplied via outlet port [5] of the control module CM-1 to the dump valve of the spray gun 12. This air pressure to the gun causes the dump valve to be pneumatically operated so that solvent flowing through the gun exits through the dump valve to a reservoir rather than being discharged through the gun nozzle. A complete disclosure of such a pneumatic dump valve may be found in U.S. Pat. No. 3,870,233, which patent is assigned to the assignee of this application. In this "flush" mode of operation of the control module CM-1, air pressure in line 83 to the pilot of valve 84 causes the valve to be moved to a position in which regulated or high pressure air is supplied to the outlet port [4] of the control module CM-1 via regulator 76 and pilot valve 84. Air from this outlet port [4] flows via line 85 and quick dump control valve CV-2 to the motor MS$_1$ of the solvent transfer pump PS$_1$. Simultaneously, air is supplied from line 85 via line 86 to a conventional solvent aspirator module 87 of the manifold 10. Upon actuation of the pneumatic drive motor of the pump PS$_1$, solvent is pumped from a solvent storage tank or reservoir 88 through a one-way check valve 89 and line 90 to the manifold 10. Upon entering the manifold 10 the solvent is mixed with the air entering via the solvent aspirator 87 such that the air and solvent mix, enter and thoroughly cleanse the manifold 10, mixer 11 and gun 12 of mixed components A$_1$, B$_1$.

While solvent is being supplied to the manifold 10, mixer 11, and gun 12 via the solvent transfer pump PS$_1$, air under pressure is simultaneously being supplied from the outlet port [3] of the control manifold and line 91 to the pneumatic motor driven transfer pumps PA$_1$, PB$_1$. So long as these motor driven transfer pumps PA$_1$, PB$_1$ are operative, liquid components A$_1$, B$_1$ are pumped through check valves 92 and 93 via lines 94 and 95 to the inlet ports [1] of the manifold modules MM-A$_1$, MM-B$_1$ respectively. As explained more fully hereinafter, in the "flush" mode of operation, a three-way flow diverter or recirculation valve 96-A$_1$ and 96-B$_1$ of the manifold modules MM-A$_1$, MM-B$_1$ causes incoming flow to ports [1] of the manifold modules to be routed via outlet ports [2] and lines 99, 100 back to the storage tanks or reservoirs 101 and 102 of the component materials A$_1$, B$_1$ respectively.

When the knob 16 of the selector switch 15 is turned to the "spray" position, the lobe 105 of the knob 16 causes the actuator 106 of a mechanically actuated three-way valve 77 to be moved to a position in which the air inlet line 81 of the selector switch is connected to the outlet port [6] of the control module CM-1. Simultaneously, the inlet line 81 of the selector switch is disconnected from line 82 via the three-way valve 78. When the line 82 is disconnected from air pressure the pilot of valve 84 is exhausted to atmosphere through the valve 78 and the valve 84 of the control module CM-1 is caused to move to a position in which the outlet port [4] of the control module CM-1 is connected to atmosphere through the three-way valve 84. The pneumatic motor MS$_1$ of the solvent pump PS$_1$ is thus connected to atmosphere through the conventional quick dump valve CV-2. Air pressure at the outlet port [6] of the control module CM-1 is transmitted via line 108 to the air intake ports [9] of the manifold modules MM-B$_1$ and MM-A$_1$. Air pressure at these inlet ports [9] of the manifold modules MM-A$_1$, MM-B$_1$ actuates the pilots of the recirculating valves 96-A$_1$, 96-B$_1$ contained within the manifold modules, thereby causing the recirculation valves 96-A$_1$, 96-B$_1$ to be moved to a position in which the spools of the valves direct component liquid materials A$_1$, B$_1$ from the metering pumps to the outlet ports [5] of the manifold modules and subsequently via lines 111 and 112 to the manifold 10.

MANIFOLD MODULES

In addition to the recirculation valves 96-A$_1$, 96-B$_1$ contained within each manifold module MM-A$_1$, MM-B$_1$ there is a pair of direction control three-way valves 113, 114 and a sample control three-way valve 115. The two direction control three-way valves 113-B$_1$, 114-B$_1$ of the manifold module MM-B$_1$ together act as a single four-way valve to connect one or the other of the two ports 49, 51 of the metering pump CB$_1$ to the manifold module inlet port [1] while simultaneously connecting the other of the two ports 49, 51 of the metering pump CB$_1$ to the outlet port [5] of the manifold module MM-B$_1$. Similarly, the two three-way valves 113A$_1$, 114A$_1$ of the manifold module MM-A$_1$ together act as a single four-way valve to connect one or the other of the two ports 48, 50 of the metering pump CA$_1$ to either the inlet port [1] of the manifold module MM-A$_1$ or to the outlet port [5] of the manifold module MM-A$_1$. The choice of which of the two ports of the metering pumps CB$_1$, CA$_1$ is connected to the inlet port and to outlet port of the manifold modules is determined by the condition of the control valve CV-1, as explained more fully hereinafter in connection with the description of the operation of the complete apparatus.

Each manifold module MM-A$_1$, MM-B$_1$ also includes a pilot operated three-way flow diverter valve 115 identical in construction to the valves 96, 113, 114 of the manifolds. These valves, so-called "sample" control valves, normally connect an inlet line 117A$_1$ or 117B$_1$ to outlet port [5] and consequently manifold 10 via lines 111, 112. When its pilot is pressurized by air pressure in line 116, the sample valve 115A$_1$, 115B$_1$ functions to connect the inlet lines 117A$_1$ or 117B$_1$ to the outlet ports [6] of the modules MM-A$_1$ or MM-B$_1$. The outlet ports [6] of the manifold modules MM-A$_1$ and MM-B$_1$ are connected to sample dump tanks 120, 121 respectively via lines 161 and 162, such that the relative proportioning of the two metering pumps may be measured and compared by simultaneously actuating the sample valves 115A$_1$ and 115B$_1$. Simultaneous actuation of these two valves 115A$_1$ and 115B$_1$ is effected by supplying air pressure to line 116 through a manually actuated sample valve 125. When the valve 125 is manually actuated, it connects the outlet port [6] of the control module CM-1 to the line 116 via line 126 and valve 125. Upon release of the manual actuator of the valve 125 the valve spool is returned by a spring to a position in which the line 126 is blocked and the line 116 is connected to atmosphere through the valve 125.

OPERATION OF FIG. 1 MODIFICATION

The operation of the apparatus depicted in FIG. 1 is initiated by manual actuation of the ball valve 72. This has the effect of connecting the air supply source 70 to the drive motors $MA_1$, $MB_1$ of the transfer pumps $PA_1$, $PB_1$ via pneumatic lines 130, 131 and 91. Assuming the mode selector switch 15 to be in the "off" position, component liquid materials $A_1$, $B_1$ are pumped by the pumps $PA_1$, $PB_1$ to the inlet ports [1] of the manifolds MM-$A_1$, MM-$B_1$ respectively. Simultaneously, inlet air is supplied via line 130 and line 140 to outlet port [2] of the control module CM-1. Air from this port is routed to the control valve CV-1 of the metering device 20. Control valve CV-1 either directs incoming air to line 141 and subsequently inlet port [8] of the manifold modules MM-$A_1$, MM-$B_1$ or to the port [7] via line 142, depending upon the setting of the valve CV-1. Simultaneously, the control valve CV-1 connects the other of the two ports [8] and [7] which is not connected to inlet air pressure to exhaust.

In the position of the control valve CV-1 depicted in FIG. 1, air pressure is supplied from line 143 to line 141 through the valve CV-1 and subsequently from line 141 to the pilots of valves $114A_1$, $114B_1$. Air pressure to the pilots of these valves causes the valves to connect the inlet ports [1] of the manifolds to outlet port [4]. Consequently, in this condition of the valves $114A_1$, $114B_1$ liquid under pressure is supplied from the inlet ports [1] through the valves $114A_1$, $114B_1$ via lines 145, 146 to the inlet ports 48 and 49 respectively of the metering pumps $CA_1$ and $CB_1$. Since the liquid supplied to the ports 48, 49 is now under pressure, the pistons of the pump are caused to move downwardly by the incoming liquid supplied to the ports 48, 49. This has the effect of causing the arm 29 of the metering device to move downwardly as indicated by the arrow 147. Simultaneously, liquid under pressure from the lower chambers 52 and 53 of the metering pumps $CA_1$, $CB_1$ is caused to flow upwardly through the piston and piston rods and out through the ports 50, 51 to the ports [3] of the manifold module MM-$A_1$ and MM-$B_1$. From the ports [3] of the manifolds the metered quantities of components $A_1$, $B_1$ are supplied through the valves $113A_1$, $113B_1$ respectively, via lines 150, 151 through the recirculation valves $96A_1$, $96B_1$ back through lines 152, 153 to the outlet ports [2] of the manifolds MM-$A_1$, MM-$B_1$. These outlet ports [2] direct the flow via lines 99, 100 back to the storage reservoirs 101, 102.

When the arm 29 of the metering device 20 reaches the lower limit of its movement, the arm 61 of the bracket 27 engages and actuates the spool 60 of the control valve CV-1, causing that spool to move to the right as depicted in FIG. 1 to a position in which inlet air line 143 is connected to line 142 and line 141 is connected to exhaust. This has the effect of connecting port [7] of the manifold modules MM-$A_1$ and MM-$B_1$ to high air pressure while simultaneously connecting port [8] to atmospheric pressure. The positions of the valves 113 and 114 are then reversed so that incoming high pressure liquid to inlet port [1] of the manifolds is now directed through valve 113 to outlet port [3]. Port [3] of manifold MM-$A_1$ is connected by line 155 to port 50 of metering pump $CA_1$ and port [3] of manifold MM-$B_1$ is connected by line 156 to port 51 of metering pump $CB_1$. In this condition of the control valve CV-1, the incoming component materials $A_1$, $B_1$ then flow to the lower chambers of the metering pumps while simultaneously the upper chambers are exhausted as a consequence of the presence of the incoming fluid forcing the pistons 36, 35 upwardly. Liquid from the ports 48, 49 then flows via lines 145, 146 to ports [4] of the manifold modules MM-$A_1$, MM-$B_1$. These ports [4] are now connected via the valves 114-$A_1$ and 114-$B_1$ to the recirculation valves 96-$A_1$, 96-$B_1$ respectively, such that the flows from the upper chambers of the ports are now directed via lines 152, 153 to the outlet return flow ports [2] of the manifolds.

So long as the selector knob 16 of the selector switch 15 remains in the "off" position, the two metering pumps 35, 36 will continue to cycle and pump the proportional quantities of components $A_1$ and $B_1$ back to the storage reservoirs 101, 102 respectively.

When the knob 16 of the selector switch 15 is rotated to the "spray" position, air pressure from the source 70 is routed through the control module CM-1 to the selector switch 15. Because of the actuation of the plunger 106 of the valve 77 by the cam lobe 105 upon turning of the knob 16 to the "spray" position, the outlet port [6] of the control module CM-1 is connected to high air pressure from line 81 through valve 77. This high air pressure from the outlet port [6] is directed via line 108 to the inlet ports [9] of the manifold modules MM-$A_1$, MM-$B_1$ respectively. Air pressure at the ports [9] of the manifold actuates the pilots of the valves 96-$A_1$, 96-$B_1$. Actuation of the pilots of these valves results in connection of the inlet lines 150, 151 of the valves 96-$A_1$ and 96-$B_1$ to the outlet lines $117A_1$, $117B_1$ and subsequently to the outlet ports [5] of the manifold modules MM-$A_1$, MM-$B_1$. Flow from the outlet ports [5] is directed to the manifold 10 and subsequently through the mixer 11 and the gun 12.

If at any time while the apparatus is in the "spray" mode of operation, it becomes desirable to determine or to change the relative proportioning of the two component materials $A_1$, $B_1$ the relative quantities of materials being pumped by the two metering pumps $CA_1$, $CB_1$ may be determined by actuating the sample button 127 of the sample control module CM-2. Upon actuation of this button 127, high pressure air is supplied from the outlet port [6] of control module CM-1 through the valve 125 to outlet port [2] of the sample control module CM-2. This port [2] is connected by line 116 to ports [10] of the manifold modules MM-$A_1$, MM-$B_1$. Air pressure to these ports effects actuation of the pilots of valves $115A_1$, $115B_1$ such that these valves now connect the lines $117A_1$ and $117B_1$ of the manifolds to discharge port [6]. These ports [6] are connected via lines 161, 162 to the sample tanks 120, 121 such that all flow through the system is now directed into the tanks. When the button 127 is manually released from actuation, the spring return of valve 125 causes ports [10] of the manifolds to be connected to atmosphere through the valve 125. The valves $115A_1$, $115B_1$ are then spring returned to a position in which flow through the valves is again directed to outlet port [5] of the manifolds. By measuring the flow to the tanks 120, 121 while the button 127 of valve 125 was manually actuated, the relative proportioning of flow from the two metering cylinders 22 and 23 may be determined.

At the conclusion of any spray cycle it is generally desirable to purge the components $A_1$, $B_1$ from those elements of the apparatus within which they are combined; that is from the manifold 10, mixer 11 and gun 12. This is effected by moving the selector knob 16 of the selector switch 15 to the "flush" position. In this "flush" mode of operation of the system, air flow is directed by the selector switch through the valve 78 via lines 82, 83 to three-way valve 84 of the control module CM-1. Actuation of this valve 78 causes air pressure to be directed through valve 84 to outlet port [4] of the control module CM-1. This air pressure is then directed via line 85 to the pneumatic motor $MS_1$ of the solvent pump $PS_1$. This pump supplies solvent through check valve 89 and line 90 to the solvent aspirator 87 and subsequently to manifold 10, mixer 11 and gun 12. Simultaneously, aspirating air is supplied via a line 86 to the solvent aspirator 87.

While the solvent pump $PS_1$ is actuated by the supply of high air pressure to solvent pump $PS_1$, the motors of the transfer pump $PA_1$, $PB_1$ continue to drive the pumps $PA_1$, $PB_1$ as a consequence of air pressure being supplied to the outlet ports [2] of the control module CM-1. However, port [6] of the control module CM-1 is now connected to atmospheric pressure through valve 77 in this "flush" mode of operation of the apparatus so that port [9] of the manifold modules are also connected to atmospheric pressure. So long as these ports [9] are connected to atmosphere the recirculation valves 96-$A_1$, 96-$B_1$ are operable to direct incoming flow to the valves 96-$A_1$, 96-$B_1$ back to the storage reservoirs 101 and 102 respectively via lines 152, 153. Consequently, during the "flush" mode of operation solvent is supplied from the reservoir 88 to the manifold 10 while simultaneously component materials $A_1$, $B_1$ are pumped from the reservoirs 101 and 102 through the manifolds MM-$A_1$, MM-$B_1$ to the metering pumps $CA_1$, $CB_1$ back to the manifolds MM-$A_1$, MM-$B_1$ and from these manifolds back to the storage reservoirs 101, 102.

One of the primary advantages of the apparatus depicted in FIG. 1 is its modularity which enables additional base components to be added to the apparatus by simply adding on appropriate modules. For example, if the base material $A_1$ is a polyol it is possible to add on multiple different polyol base materials to the apparatus in a manner which will enable these different polyol base materials to be interchangeably combined with the coreactant material $B_1$ in the same or different proportions.

FIG. 2 MODIFICATION

Figure 2B:
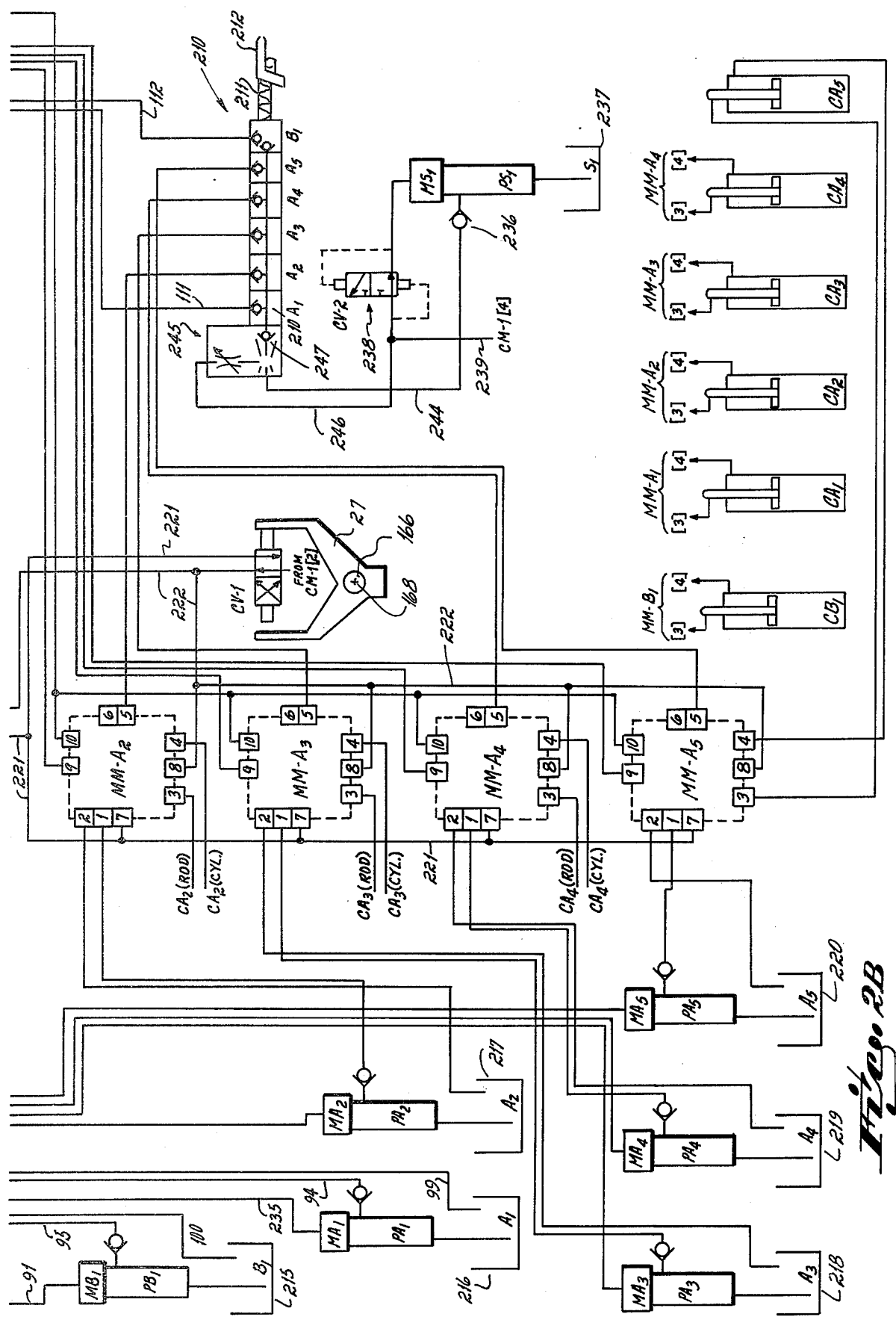

A modular system for interchangeably effecting this multiple component pumping of five different base components, as for example five different color paints combinable with a single coreactant material, is depicted in FIG. 2. To effect this five color interchangeability of base components, a color selector switch CM-3 must be inserted between outlet port [6] of the control module CM-1 and inlet port [1] of the sample module CM-2. Additionally, selector valve modules CM-4$A_1$ through CM-4$A_5$ must be inserted into the circuit to remove the load of unused metering cylinders or pumps from the load being carried by the one selected metering cylinder or pump. The control module CM-1 though remains the same in this multiple base component system as in the two component system of FIG. 1. Similarly, the manifold modules MM-$A_1$ and MM-$B_1$ remain the same in this multiple interchangeable base component system but an additional identical manifold module is added for each additional base material or color added to the apparatus. Similarly, an additional identical transfer pump and identical metering pump is added for each additional base component or color added to the apparatus.

In this second FIG. 2 embodiment of a two component system, those modules and component elements of the second embodiment which are identical to modules or elements of the FIG. 1 embodiment have been designated by identical numerals or indicia. This identical designation approach is particularly apt for this description of two different embodiments since the second FIG. 2 embodiment includes all of the apparatus of FIG. 1 to which additional modules have been added to enable the system to interchangeably spray or dispense multiple different base or color materials after mixture with a common coreactant material $B_1$.

METERING DEVICE

Referring to FIG. 3 there is illustrated a multiple color paint metering device 165 which may be utilized in the practice of this second embodiment of the invention. This metering device 165 includes a U-shaped bracket 27 and a control shaft 166 fixedly attached to the bracket 27. The control shaft 166 is pivotally supported within posts 167 for rotation about the axis 168 of shaft 166. There are six tines or support shafts 171-176 fixedly secured to the control shaft 166 by supporting blocks 177. Each tine or shaft 171-176 adjustably supports the upper end of the piston rod of one of the metering pumps $CA_1$, $CA_2$, $CA_3$, $CA_4$, $CA_5$, $CB_1$. The cylinders of all six metering pumps are adjustably mounted upon the base 178 of the metering device. In a preferred embodiment, the cylinders of the metering pumps are secured within trackways 179 within which they are adjustably secured, as by spring detents (not shown) so as to facilitate adjustment of the cylinders toward and away from the base support post 167.

In some multiple component paint systems, the relative proportioning of the multiple different base and coreactant materials remains the same from one color to the next. In the event that the proportioning is to remain the same, the base of the cylinders $CA_1$–$CA_5$ may be mounted upon a common slide and similarly the top mounting brackets 41 of the pumps $CA_1$–$CA_5$ may be mechanically interconnected so that they all will be adjusted together relative to the cylinder $CB_1$.

COLOR SELECTOR MODULE CM-3

The color selector module CM-3 is a commercially purchaseable item of hardware which has a manually settable dial 230 operable to connect an inlet port [1] with any one of five different outlet ports [2], [3], [4], [5] and [6]. In the preferred embodiment it has a pneumatic lock 198 operable to lock the dial in whatever position it is located when high pressure air is supplied to the module. In the preferred embodiment the dial also has a pneumatically operable signal 206 to indicate that air is being supplied to the module CM-3. Of course, color selector modules CM-3 with greater numbers of outlet ports may be substituted for the five outlet port module CM-3 or identical modules could be serially stacked if a greater number of choices of base material or colors is desirable.

The color selector module CM-3 of this second embodiment functions as a second control module of the pneumatic logic circuit. It is operable to connect high pressure air from outlet port [6] of the control module CM-1 selectively to any one of five different outlet ports [2], [3], [4], [5] and [6] of the color selector module CM-3. These outlet ports [2], [3], [4], [5] and [6] are connected to the [9] port of the manifold modules MM-$A_1$, MM-$A_2$, MM-$A_3$, MM-$A_4$ MM-$A_5$ and to the number [4] port of the selector valve modules CM-$A_1$, CM-$A_2$, CM-$A_3$, CM-$A_4$, CM-$A_5$ respectively. Depending upon the setting of the color selector module dial 230, the hydraulic flow circuit of one of the colors or base materials $A_1$, $A_2$, $A_3$, $A_4$, or $A_5$ is always connected by the color selector module to its respective selector valve module CM-4 and manifold module MM.

SELECTOR VALVE MODULES

The selector valve modules CM-$4A_1$, CM-$4A_2$, CM-$4A_3$, CM-$4A_4$, and CM-$4A_5$ are all identical. Therefore, only one has been completely illustrated and will be described in detail. Each selector valve module CM-$4A_1$ through CM-$4A_5$ contains two pilot operated three-way valves; a selector valve 207 and a quick dump valve 208. The selector valve 207 is a conventional single pilot spring return valve while the quick dump valve is a conventional dump valve operated by pressure differential between opposite ends of the poppet (not shown) of the valve 208.

The selector valve 207 is operable when the pilot is actuated to connect a number [1] inlet port of the module to an outlet port [3] via valve 208. When the pilot of the selector valve 207 is unactuated, the spring 197 of the selector valve 207 maintains the valve in a position in which a second inlet port [2] is connected via the valve 208 to the outlet port [3] of the module. As is explained more fully hereinafter, the inlet port [2] of the selector valve modules are all connected to a low pressure regulator 196 while the number [1] ports are connected to a high pressure regulator 75 of the control module CM-1. Consequently, when the pilot port [4] of a particular selector valve module is actuated, the outlet port [3] of that module is connected to a high pressure source of air pressure, but when the pilot is unactuated (because it is not connected to a source of air pressure through the color selector module CM-3) the outlet port [3] of the selector valve module is connected to a low air pressure source.

The quick dump valve 208 functions to very quickly dump air pressure from the pneumatic drive motor of a particular transfer pump $PA_1$-$PA_5$ with which it is connected to atmosphere when the motor is disconnected from a driving source of air pressure. This quick dump of air pressure from the driving motor of the transfer pumps functions to prevent the motor from continuing to drive the pump with residual air pressure after the motor is disconnected from a driving source of air pressure. If there is residual air pressure in the pneumatic drive motor, as for example in motor $MA_1$, after the motor is disconnected from a driving source of air pressure at the control module CM-1, that residual pressure actuates the pilot 195 of the valve 208 nearest the source of residual air pressure and causes the valve to move to a position in which the residual air pressure is quickly dumped to atmosphere through the dump valve 208.

OPERATION OF FIG. 2 MODIFICATION

To start the apparatus depicted schematically in FIG. 2, the ball valve 72 is manually actuated so as to operatively connect the source of air pressure 70 to the pneumatic control module CM-1. Assuming that the dial 16 of the selector switch 15 is in the "off" position, the transfer pumps $PB_1$, $PA_1$, $PA_2$, $PA_3$ $PA_4$, $PA_5$ will all immediately initiate operation to pump the coreactant material $B_1$ as well as all of the different color paints $A_1$, $A_2$, $A_3$, $A_4$, $A_5$ of their respective metering pumps $CB_1$, $CA_1$, $CA_2$, $CA_3$, $CA_4$, $CA_5$. The flow from the metering pumps though, in the "off" setting of the selector switch 15, is directed by the recirculation valves 96 of the manifold modules MM-$A_1$, MM-$A_2$, MM-$A_3$, MM-$A_4$, MM-$A_5$ back to the storage tanks or reservoirs 215, 216, 217, 218, 219 and 220 of the coreactant material $B_1$ and the color materials $A_1$, $A_2$, $A_3$, $A_4$, $A_5$ respectively. In other words, in the "off" setting of the selector switch the coreactant material as well as each of the different color materials are pumped through the system but are recirculated back to their respective storage tanks, as explained more fully hereinafter.

With the selector switch 15 of the CM-1 in the "off" position, actuation of the ball valve 72 results in air at line pressure being supplied via outlet port [2] of the control module CM-1 and a low pressure regulator 196 to inlet ports [2] of each of the selector valve modules CM-$4A_1$, CM-$4A_2$, CM-$4A_3$, CM-$4A_4$, CM-$4A_5$. This low air pressure, as for example 20 psig, is supplied to the number [2] port of these selector valve modules through the pressure regulator 196 and line 250. From the number [2] ports of the control modules CM-$4A_1$, CM-$4A_2$, CM-$4A_3$, CM-$4A_4$, CM-$4A_5$, the low air pressure is directed via the exit port number [3] and line 235 to the drive motors $MA_1$, $MA_2$, $MA_3$, $MA_4$, $MA_5$ of the transfer pumps $PA_1$, $PA_2$, $PA_3$, $PA_4$, and $PA_5$. This low air pressure then drives the motors with a force just sufficient to overcome friction in the transfer pumps $PA_1$ through $PA_5$ and in the metering pumps $CA_1$, $CA_2$, $CA_3$, $CA_4$, $CA_5$.

With the selector switch 15 in the "off" position, actuation of the ball valve 72 at the control module CM-1 also results in high pressure air being supplied through lines 130, 131 and pressure regulator 75 to the number [3] port of the control module CM-1. This high pressure port is connected via line 91 to the motor $MB_1$ of the transfer pump $PB_1$. Consequently, immediately upon actuation of the control circuit and even with the selector switch 15 in the "off" position, high pressure air is supplied via line 91 to the motor $MB_1$ of the transfer pump $PB_1$. This results in the coreactant material $B_1$ being pumped via line 95 to the inlet port [1] of the manifold module MM-$B_1$. So long as the selector switch is in the "off" position though that incoming liquid $B_1$ to the manifold module MM-$B_1$ is directed from the inlet port [1] of the manifold MM-$B_1$ through the direction control valves 113-$B_1$, 114-$B_1$ to the metering pumps, back through the direction control valves to the outlet port [2] of the manifold module MM-$B_1$. That port is connected by the line 100 back to the reservoir 215. The coreactant material is thus pumped and recirculated back to the reservoir until the selector switch 15 is moved to the "spray" position mode.

The high pressure recirculating flow of coreactant $B_1$ and low pressure recirculating flow of color materials $A_1$ through $A_5$ is maintained through the metering pumps by air flow from the control module CM-1 being directed via exit port [2] to control valve CV-1. Control valve CV-1 is operable to either direct flow from the control valve to line 221 or 222, depending upon the condition of the two position valve CV-1. The condition of the valve is determined by the position and direction of movement of the metering device arm 166. In the position of the valve CV-2 illustrated in FIG. 2, air pressure from port [2] of the control module CM-1 is directed to line 222. Line 221 is connected to atmospheric pressure in this position of the valve CV-1. Line 222 is connected to port [8] of each of the manifold modules MM-$B_1$, MM-$A_1$, MM-$A_2$, MM-$A_3$, MM-$A_4$, and MM-$A_5$. This manifold module port [8] is connected to the pilot of valves 114 in each manifold module. Actuation of the pilots of these valves 114 moves the valves 114 to a position in which liquid inlet port [1] of each manifold module is connected to outlet [2]. Inlet port [1] of each manifold module is connected via lines 95 to the pressure or outlet ports of the pumps $PA_1$, $PA_2$, $PA_3$, $PA_4$, $PA_5$ so that liquid under pressure is supplied from each of the pumps through the valves 114 of each manifold to the upper chamber of each of the metering pumps $CA_1$, $CA_2$, $CA_3$, $CA_4$, $CA_5$. The pressure of this liquid is effective to cause the pistons of the metering pumps to move downwardly simultaneously and force liquid from the lower chambers through the ports in the piston rods. These piston rod ports [3] of each of the metering pumps $CB_1$, $CA_1$, $CA_2$, $CA_3$, $CA_4$, $CA_5$ are connected to the [3] ports of the manifold modules MM-$B_1$, MM-$A_1$, MM-$A_2$, MM-$A_3$, MM-$A_4$ and MM-$A_5$ respectively. The number [3] ports of the manifold modules are at this time connected by the recirculating valves 96 to the number [2] or return ports of the manifold modules. Consequently, the paint from each of the metering pumps is directed from the number [2] ports of the manifold modules back to the paint reservoirs 215–220 respectively via lines 99, $100A_1$, $100A_2$, $100A_3$, $100A_4$ and $100A_5$.

At the end of each stroke of the metering pumps $CB_1$, $CA_1$, $CA_2$, $CA_3$, $CA_4$, $CA_5$ the bracket 27 attached to the end of the arm 166 actuates the plunger of the mechanically activated valve CV-1 and causes that spool to be mechanically moved to the second of its two positions. In this second position, the control valve CV-1 is operable to connect the incoming air from the control module CM-1 to the line 221 while simultaneously connecting the line 222 to exhaust. This has the effect of directing the incoming air from the valve CV-1 to the number [7] port of each manifold module while simultaneously connecting the number [8] port of each manifold module to exhaust through the control valve CV-1. As a consequence of the reversal of the two valves 113 and 114 in each of the manifold modules, the incoming liquid flow to the number [1] port of each manifold module is directed through the valve 113 to the number [3] port of the manifold module. Simultaneously, the number [4] port of each manifold module is now connected to the number [2] return flow port of that module through direction control valve 114 and recirculation flow valve 96. Consequently, as a result of this repositioning of the valves 113, 114 of each manifold module, the liquid from each of the transfer pumps $PB_1$, $PA_1$, $PA_2$, $PA_3$, $PA_4$, $PA_5$ is now routed to the cylinder rod port [3] of each metering pump and the cylinder port [4] of each metering pump is now routed to the reservoir of the respective coreactant or color material.

This continuous recirculating flow of each of the colors $A_1$ through $A_5$ and of the coreactant material $B_1$ will continue until a particular color is selected at the color selector module CM-3 and the knob 16 of the selector switch 15 in module CM-1 is moved to a "spray" condition. Assuming, as an example, that the color selector is in the position illustrated in FIG. 2 in which the color $A_1$ has been chosen to be mixed with the coreactant $B_1$ and sprayed from the gun 12, movement of the knob 16 to the "spray" position will result in the incoming air to the control module CM-1 being directed through the valve 77 of the selector switch to the number [6] port of the control module CM-1. Port [6] of the pneumatic control module CM-1 is connected to the number [1] inlet port of the color selector module CM-3. With the dial 230 of the color selector in the position shown in FIG. 2, inlet port number [1] is connected through the dial 230 to outlet port [2] of the color selector module. This outlet port [2] is in turn connected via lines 231, 232 to the number [9] port of manifold module MM-$A_1$ and the number [4] port of selector valve module CM-$4A_1$. Port [4] of the selector valve module CM-$4A_1$ is connected to the pilot of selector valve 207 so that the valve 207 is now moved to a position in which low air pressure port [2] of control module CM-$4A_1$ is closed and high air pressure port number [1] is opened and connected to line 233 of the valve selector module CM-$4A_1$. Port [1] of the control valve CM-$4A_1$ is now connected via outlet port [3] and line 235 to the drive motor $MA_1$ of transfer pump $PA_1$.

Connection of the number [9] port of the manifold module MM-$A_1$ to line air pressure through the color selector module CM-3 upon selection of the "spray" mode, has the effect of actuating the pilot of recirculation valve $96A_1$. Actuation of the pilot of this valve $96A_1$ results in liquid flow from the metering pump into the recirculating valve $96A_1$ being directed through line $117A_1$ and sample valve $115A_1$ to the number [5] port of the manifold module MM-$A_1$. This number [5] port is connected via line 111 to the check valve module $210A_1$ of the manifold 210. Consequently, the paint $A_1$ is now supplied to the manifold 210 at high pressure.

Simultaneously, with the flow of color $A_1$ to the manifold 210, coreactant material $B_1$ is supplied to the check valve containing manifold module $210B_1$ via line 112 from the number [5] port of the manifold module $B_1$. This flow of the coreactant material $B_1$ occurs immediately upon selection of the "spray" mode of operation at the dial 16 of the color selector because of the number [6] port of the control module CM-1 then being connected to the air pressure source 70 through the valve 77 of the control module CM-1. This port [6] of the control module CM-1 is always connected via lines 240, 242 to the mumber [9] port of the manifold module MM-$B_1$. Consequently, selection of the "spray" mode of control, irrespective of what color is chosen, always results in actuation of the pilot of recirculation valve $96B_1$. Actuation of that pilot connects flow from the metering pump CB-1 through the direction control valves 113-$B_1$, 114-$B_1$ and the recirculation valve line 117-$B_1$ to the inlet to sample valve 115-$B_1$. The outlet of this sample valve 115-$B_1$ is now connected to the number [5] port of the manifold module MM-$B_1$. The number [5] port of this manifold is connected via line 112 to the check valve containing module 210-$B_1$.

The paint $A_1$ entering the manifold 210 mixes with the coreactant material $B_1$ in the course of passage through the manifold 210. It is further mixed in the course of passage through the fixed screw mixer 211 before being sprayed from the gun 212.

The proportional quantities of materials $A_1$, $B_1$ mixed and sprayed from the gun 212 is a function of the distance of the metering pumps $CA_1$ from the axis 168 of the metering arm 166 relative to the distance of the metering pump $CB_1$ from that same axis 168. By changing those relative distances, the proportions may be varied.

In the event that it becomes desirable to change colors, as for example by changing from the color $A_1$ to the color $A_3$, the manifold 210, mixing chamber 211 and gun 212 should first be purged of the old material $A_1$ before the new material $A_3$ is dispensed. To this end the selector switch 15 is placed in the "flush" position so as to cause solvent $S_1$ to be run through those common elements 210, 211 and 212 of the apparatus.

Placement of the dial 16 of the selector switch 15 in the "flush" position moves the actuator 80 of the valve 78 to a position in which the line 81 of control module CM-1 is connected via lines 82 and 83 to the pilot of three-way valve 84. Actuation of the pilot of this valve causes the valve 84 to connect port [4] of control module CM-1 to inlet air pressure via line 130 and high pressure regulator 76. This outlet port [4] is connected to the inlet air line 239 of the pneumatic motor $MS_1$ of the transfer pump $PS_1$ through a quick dump valve 238. Actuation of this motor causes solvent $S_1$ to be pumped from a reservoir 237, through a check valve 236, and line 244 to a solvent aspirator module 245 of the manifold 210. High air pressure from line 239 is also supplied via line 246 to the solvent aspirator 245. The solvent then flows through the solvent aspirator 245, through a check valve 247 contained within the aspirator and into and through the common passages of the manifold 210, the mixer 211, and to the gun 212. A dump valve (not shown) of the gun 212 is simultaneously activated by connection of a pneumatic motor of the dump valve to outlet port [5] of the control module CM-1. The solvent is thus dumped through the dump valve rather than being forced through the nozzle of the gun.

The solvent will continue to flow from the reservoir 237 through the dump valve of the gun 212 until the selector knob 16 of the selector switch 15 is moved to either the "off" or "spray" position. The color selector dial 230 of the color selector module CM-3 may be moved to a new color selection while the selection switch 15 is in the "flush" or "off" positions because of the pneumatic lock 198 of the module then being in a nonactivated condition. Having selected the new color the knob 16 of the selector switch 15 may be moved to a "spray" condition in which event the new selected color will be pumped at high pressure from the appropriate reservoir, through the selected manifold module, to the selected metering pump, from the metering pump back through the same manifold module, and from there to the manifold 210 and subsequently to the dispensing gun 212.

If while the apparatus is operating in the spray mode it becomes desirable to measure the relative proportions of materials being sprayed, as for example the quantity of color $A_1$ being mixed with the coreactant material $B_1$, the sample actuator button 127 of the sample module CM-2 may be actuated. This has the effect of connecting port [6] of the pneumatic control module CM-1 with the inlet port [1] of the sample module CM-2 through lines 240, 241 and 260. Actuation of the sample module button 127 connects the inlet port [1] with the outlet port [2]. This port [2] of the sample module CM-2 is connected to the number [10] port of each of the manifold modules MM-$B_1$, MM-$A_1$, MM-$A_2$, MM-$A_3$, MM-$A_4$, MM-$A_5$. When the apparatus is in the "spray" mode of operation, the supply of high pressure air to the number [10] ports of the manifold modules results in actuation of the pilots of the sample valve 115 in each module. In the spray mode of operation though, only the manifold modules of the selected color, as for example $A_3$, and the coreactant material $B_1$ will be supplying paint and coreactant material through the sample valves 115$A_1$ and 115$B_1$ to the manifold 210 at any one time. Actuation of the pilots of all of the sample valves 115 of all of the manifold modules thus results in flow from only two outlet ports [6] of the manifold modules to sample reservoirs 120, 121. So long as the sample button remains manually activated, paint and coreactant material will flow to those two reservoirs rather than to the manifold 210. Upon release of the button 127 flow from the manifold modules will return to the manifold 210 and the quantity of material supplied to the two sample tanks or reservoirs from the sample ports [6] may be measured to determine the relative quantity or proportions of materials being supplied by the metering pumps to the manifold 210.

It is to be noted that while one color or base material, as for example color $A_3$, and one coreactant material $B_1$ are being pumped to the manifold at high pressure, the other colors or base materials $A_1$, $A_2$, $A_4$, and $A_5$ are being pumped at low pressure through their respective metering pumps $CA_1$, $CA_2$, $CA_4$, $CA_5$ and back to their respective reservoirs. The low pressure flow through the metering pumps $CA_1$, $CA_2$, $CA_4$, and $CA_5$ results from the low air pressure used to drive the transfer pumps $PA_1$, $PA_2$, $PA_4$, and $PA_5$ of the unselected colors while the apparatus is in the "spray" mode. This low pressure recirculating flow through the unselected metering pumps functions to remove the load of the unused metering cylinders from the load required to be moved by the selected cylinder, $CA_3$ in this example. If that load were not removed, the full pressure applied to the driving side of the piston of the unused metering cylinders would be so great as to create excessively large and potentially destructive internal pressures within the selected cylinder and upstream from it. Alternatively, if high air pressure were used (rather than low pressure) to actuate the motors of the unselected transfer pumps $PA_1$, $PA_2$, $PA_4$, $PA_5$, the pressure in the selected metering cylinder, $CA_3$ in the example, and downstream from it would be excessive. The low air pressure used to drive the transfer pumps of the unselected colors is chosen to be just sufficient to overcome internal friction in the pumps of the unselected colors.

The modularity of the apparatus disclosed in FIG. 2 illustrates the ease with which additional interchangeable base materials may be added to the system of FIG. 1. Additionally, with equal facility additional colors or base materials may be added to the system of FIG. 2. If more than five different base colors are desired, for example, if a sixth color is to be added, all that is required is to connect a sixth outlet port to the color selector, add a sixth selector module CM-4$A_6$, connect a sixth manifold module MM-$A_6$ and add a sixth metering pump $CA_6$. This add on capability can go on very nearly indefinitely without any loss of efficiency of the system.

In addition to the flexibility of the system provided by its modularity, it is to be noted that the manifold modules and selector modules are all made up from either single pilot, spring return three-way valves or double pilot, three-way valves. The system thus has the advantage of minimizing the number of different types of valves which must be maintained in reserve for repair or replacement purposes.

As explained hereinabove, the need for selector modules CM-4A$_1$ through CM-4A$_5$ results from the combined loading effects of multiple metering cylinders, CA$_1$ through CA$_5$, linked to a common structure. Since, when painting, only one of the cylinders communicates with the spray gun 212 the other cylinders are connected by the manifold modules MM-1, MM-2, etc. back to their respective paint reservoirs. Under these conditions all of the cylinders are being driven by their respective external pressure sources, but only one, the cylinder whose color has been selected to spray, is capable of being back pressured by the valving in the spray gun. Thus, when the valve in the gun is closed, all cylinders are putting motive force into the arm structure 166 but only one cylinder outlet line can be valved to react against this aggregate force. The net effect is that of a pressure multiplier and it is obvious that excessive pressures will result in the cylinder, valving, fluid lines and manifolds which communicate with the gun.

Therefore, it is desirable to remove, relieve, or reduce (hereinafter generically referred to as isolate) the force contribution of the metering cylinders whose colors are being recirculated. This force reduction or isolation may be accomplished in several ways, one of which, the method of reducing air pressure to the air motor of the external transfer pumps, has previously been described hereinabove with reference to the apparatus of FIG. 2. A second method would reduce the hydraulic pressure in the fluid lines feeding the manifold modules MM-1, MM-2, etc. by means of fluid pressure regulators and fluid selector valves. This is the hydraulic analog of the pneumatic method described previously. This hydraulic analog is completely illustrated in FIGS. 4A and 4B.

A third method would mechanically decouple the piston rods of the metering cylinders from the arm 166 so that only the cylinder whose color is being sprayed is linked by the arm to the coreactant cylinder CB$_1$. This is the mechanical analog of the pneumatic method previously described hereinabove. One preferred embodiment of the mechanical analog is completely illustrated in FIGS. 5A, 5B, through FIG. 8.

In each of the three alternative analogous decoupling methods, the pneumatic (FIG. 2), hydraulic (FIG. 4) or mechanical (FIG. 5) decoupling, the primary objective is the isolation of the cylinder whose color is being sprayed from the motive force contribution of those cylinders whose colors are not being sprayed.

FIG. 4 MODIFICATION

Figure 4B:
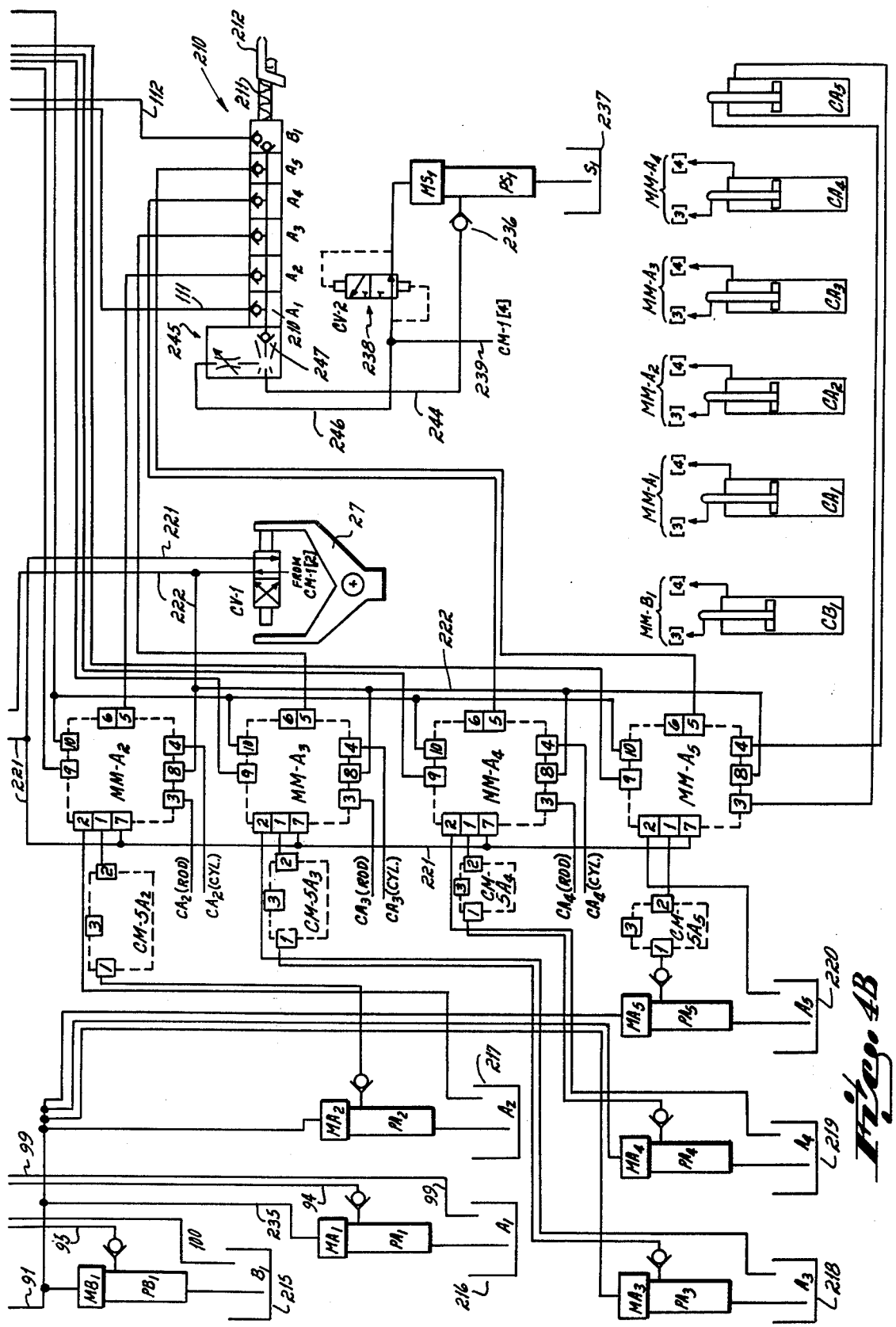

Referring now to FIG. 4 (which is broken for illustration purposes into FIGS. 4A and 4B) there is illustrated the hydraulic analog of the pneumatic control method previously described with reference to FIGS. 2 and 3. In this hydraulic system, the apparatus employed is very nearly identical to the apparatus employed in the pneumatic control system of FIGS. 2 and 3. Accordingly, those portions of the two different apparatuses which are common or identical have been given identical numerical designations.

In this embodiment the selector valve modules CM-4A$_1$ through CM-4A$_5$ are replaced by hydraulic by-pass control modules CM-5A$_1$ through CM-5A$_5$ respectively. Each of these by-pass modules CM-5A$_1$ through CM-5A$_5$ contains a single low pressure hydraulic regulator 301 and a pilot operated, two-way, by-pass valve 302 as well as a hydraulic inlet port [1], a hydraulic outlet port [2] and a pneumatic inlet port [3]. The hydraulic inlet ports [1] are connected to the outputs of the transfer pump P$_1$ through P$_5$ with which the by-pass modules CM-5A$_1$ through CM-5A$_5$ are associated. The outlet ports [2] of each by-pass module is connected to the inlet ports [1] of one of the manifold modules MM-A$_1$ through MM-A$_5$. These hydraulic ports are thus connected in the lines 94 between the pumps and the manifold modules. The pneumatic inlet port of each by-pass module CM-5A$_1$ through CM-5A$_5$ is connected with one of the five exit ports of the color selector module CM-3 such that the pilot of one of the by-pass modules will be actuated in response to selection of a particular color at the color selector module CM-3.

Internally of the by-pass module each inlet port [1] is connected to outlet port [2] through the regulator 301 and through the parallel connected two-way by-pass valve 302. In operation, when the pilot of the valve 302 is unactuated, passage through the by-pass valve 302 is blocked and all liquid flows through low pressure regulator valve 301 to the exit port [2]. When the pilot of valve 302 is actuated however, flow through the by-pass module is routed by the valve 302 around the low pressure regulator 301 to the exit port [2] so that all paint or component material passing through the by-pass valve module is at high pressure so long as the pilot of the by-pass module remains actuated.

In operation, the apparatus of this FIG. 4 modification functions in exactly the same manner as the apparatus of FIG. 2 when the apparatus is in the "flush" mode. In the "off" mode, actuation of the start-up valve 72 results in high air pressure being supplied via lines 130, 131 and exit port [3] of the control module CM-1 to each of the motors MB$_1$, MA$_1$ through MA$_5$ of the transfer pumps PB$_1$, PA$_1$ through PA$_5$ via lines 91. This high pressure air drive of the pneumatic motors of the transfer pumps results in high pressure fluid exiting from the transfer pumps to all of the by-pass modules CM-5A$_1$ through CM-5A$_5$. In this "off" mode of operation, the pilot of all of the by-pass modules CM-5 are unactuated so that the high pressure fluid supply to all of the by-pass modules is forced to flow through regulator 301 of the modules to the exit port [2] and subsequently to the entrance port [1] of each of the manifold modules MM-A$_1$ through MM-A$_5$. As was explained hereinabove in connection with the operation of the modification of FIG. 2, the coreactant material B$_1$ and all of the color material A$_1$ through A$_5$ are routed from the entrance port [1] of the manifold modules back to the respective reservoirs 215 and 220 via the manifold modules so long as the selector switch 15 remains in the "off" mode position.

When the selector switch 15 is moved to the "spray" mode, high pressure air is routed through the valve 77 of the control module CM-1 to the exit port [6] of that control module CM-1. This exit port [6] of the control module CM-1 is now connected via the color selector module CM-3 to one of the pneumatic entrance ports [3] of one of the by-pass modules CM-5A$_1$ via the color selector dial 230. As the dial 230 connects the port [6] of the control module CM-1 to the exit port [2] of the control module CM-3 so that high pressure air is routed from the color selector module via lines 231 and 232 to the pilot of the valve 302 in by-pass module CM-5A$_1$.

Actuation of this pilot causes high pressure fluid from the transfer pump $PA_1$ to be routed through the by-pass valve 302 of the module $CM-5A_1$. As explained hereinabove in connection with the description of FIG. 2, high pressure fluid is then routed by the manifold module through the metering pump, back through the manifold module, and subsequently to the gun 212.

As can now be appreciated, the FIG. 4 embodiment is the hydraulic analog of the pneumatic system illustrated in FIG. 2. Rather than driving a selected transfer pump with high air pressure while simultaneously driving the other unselected pumps via a low air pressure, this hydraulic analog works upon the principle of driving all of the transfer pumps at high pressure but of by-passing all but a selected color paint through a low pressure regulator so that ultimately only the selected color enters its manifold module at high pressure. The net effect is that the hydraulic pressure in the fluid lines feeding the manifold modules $MM-A_1$ through $MM-A_5$ of the unselected colors is at a reduced pressure while the hydraulic pressure in the fluid line feeding the manifold module of the selected color is at a higher operation pressure. The metering pump of the selected color is thus isolated from the motive force contribution of the other metering pumps of the unselected colors because the low pressure regulators 301 within each by-pass module $CM-5A_1$ through $CM-5A_5$ is set at a pressure which is just sufficient to drive the metering pumps and overcome frictional forces without either adding to or subtracting from the motive force of the selected metering pump.

MODIFICATION OF FIG. 5

Referring now to FIG. 5, there is illustrated the mechanical analog of the pneumatic control of FIG. 2 or the hydraulic control of FIG. 4. In this FIG. 5 modification, all of the apparatus which is identical in the apparatus employed in the modification illustrated in FIG. 2 has been given identical numeral designations.

Principally, the apparatus of FIG. 5 differs from the apparatus of FIG. 2 in that the selector valve modules $CM-4A_1$ through $CM-4A_5$ are replaced by air operated mechanical couplers or clutches $405A_1$ through $405A_5$ respectively. In this modification all of the base components or colors are supplied to their respective associated manifold module at full operational pressures. In this mechanical analog version though the metering pumps $CA_1$ through $CA_5$ of the unselected colors are mechanically decoupled or declutched from the metering pump of the selected color. Consequently there is no motive force contribution from the metering pumps of the unselected colors to the metering pump of the selected color.

This mechanical uncoupling is accomplished by the pneumatically operated clutches 405 depicted in FIGS. 6 and 7. The clutches 405 are all identical and accordingly only one is illustrated and described in detail. Each clutch 405 comprises an annular cylinder 406 within which there is an annular chamber 407. Each cylinder 406 is freely slidable over the piston rod 408 of one of the metering pumps $CA_1$ through $CA_5$. A swivel coupling pin 411 pivotally connects each cylinder 406 to a slidably adjustable bracket 409 of the metering system 410. This pin permits the cylinder to rotate or pivot relative to the adjustable sliding block or bracket 409 as the cylinder moves vertically or axially over the piston rod 408.

Contained with each annular cylinder 406 there is a ball bearing cage 412 which is freely slidable over the piston rod 408. Ball bearings 415 are located within holes or apertures 416 radially spaced about the ball bearing cage 412.

Radial movement of the balls 415 into and out of engagement with an annular recess 417 of the piston rod 408 is controlled by an actuating ring 418. This ring has an annular recess 419 machined from its lower inside edge, which recess is adapted to receive the balls 415 when the actuating ring is in an unactuated condition. A spring 420 biases the actuating ring to this uppermost or unactuated condition.

A pneumatic chamber 421 is defined between the upper edge of the actuating ring 418, the outer or peripheral surface of the bearing cage 412, and the inner surface of the annular cylinder 406. There is a resilient lip seal 422 located atop the actuating ring 418 so as to seal the chamber 421.

In operation, the pneumatic clutches 405 are normally maintained in a disengaged condition relative to the piston rods 408 because of the springs 420 biasing the actuating rings to their uppermost position. In this uppermost position the balls 415 rest within the recess 419 of the actuating ring, in which position the balls are free to roll over the surface of the piston rod 408 as the clutches 405 are caused to move relative to the piston rods 408. When the chambers 421 of the clutches are pressurized by air pressure being supplied to the chambers, the actuating rings 418 are caused to move downwardly, which movement can only occur when the balls 415 are radially aligned with the groove or recess 417 of the piston rod 408. When the actuated ring 418 moves downwardly, it causes the balls 415 to be cammed into engagement with the annular slot 417 thereby locking the pneumatically actuated clutch 405 to the piston rod 418. With reference to FIG. 5 the apparatus here depicted operates in the same manner as the apparatus of the analog of FIG. 4 in the "flush" and "off" modes except that in this embodiment the recirculating colors all are recirculated back to their respective storage tanks at high pressure rather that at low pressure in the "off" mode. In the "spray" mode of operation, the color selector dial 230 is operable to pneumatically actuate one of the clutches $405-A_1$ through $405-A_5$. Depending upon which color is selected at the dial 230, one of the clutches is thereby coupled to its associated piston rod 408. The other clutches 405 of the unselected colors remain pneumatically connected to atmosphere through the color selector dial 230 so that the springs of these clutches maintain the clutches in a disengaged condition relative to the piston rod with which they are associated. Consequently, in the "spray" mode of operation only the metering pump $CA_1$ through $CA_5$ of the selected color is operatively connected to the metering device 165 while the piston rods of the other metering pumps move freely through the clutches but without having any force effect upon the metering device. Flow from the unselected metering pumps, as explained hereinabove in connection with modification of FIG. 2, is routed from the unselected metering pumps back to the reservoir of the respective colors. The net effect is that the metering pump of the selected color is in this embodiment mechanically isolated from the motive force contribution of the metering pumps of the other unselected colors. Consequently, those other metering pumps do not input to the selected color motive force which would otherwise increase the fluid pressure downstream from the metering pump of the selected color.

While we have described only two preferred embodiments of the invention, persons skilled in the art to which the invention pertains will appreciate numerous changes and modifications which may be made without departing from the spirit and scope of the invention. Therefore, we do not intend to be limited except by the scope of the following claims.

We claim:

1. Apparatus for selectively proportionally metering and mixing one of a plurality of base flowable component materials with a common coreactant flowable component material, which apparatus comprises,
   - a pressurized source for each of a plurality of base component materials,
   - a pressurized source of a coreactant component material,
   - a metering cylinder for each base and coreactant component material, a metering piston reciprocable within each cylinder, a piston rod attached to said piston and extending outwardly from a cylinder end wall, said metering piston being operative to divide said metering cylinder into opposed end chambers,
   - mixing means for mixing at least one of said base component materials with said coreactant component material, said mixing means including a chamber having inlet ports for the component materials and an outlet for the mixture of component materials,
   - a plurality of manifold modules, each of said manifold modules having inlet means operatively connected to one of said pressurized sources, each of said manifold modules also being operatively connected to opposite end chambers of one of said metering cylinders, each of said manifold modules further having outlet means operatively connected to said mixing means, each of said manifold modules having direction control valve means therein operative to alternately connect opposite end chambers of one of said metering cylinders to said inlet means and to said outlet means;
   - control valve means in flow controlling communication with said direction control valve means of said manifold modules,
   - a pivotally mounted beam connected to the piston rod of each of said metering pistons, said beam being operatively connected to said control valve means so as to effect reversal of said control valve means in response to movement of said metering pistons,
   - pneumatic logic control means for simultaneously connecting one of said plurality of sources of base component material and said source of coreactant component material with said mixing means,
   - said pneumatic logic control means comprising a base component selector module and a plurality of base component selector valve modules, said base component selector valve modules being connected via a pneumatic control circuit to said base component selector module, said base component selector valve modules being equal in number to the number of said plurality of base components,
   - a plurality of pneumatic motor driven transfer pumps, each of said transfer pumps being operative to pump one of said component materials to said inlet means of one of said manifold modules,
   - each of said base component selector valve modules being operable to route either high pressure air or low pressure air to one of said plurality of pneumatic motor driven transfer pumps, and
   - said pneumatic logic control means operable to simultaneously route high pressure air to one of the plurality of pneumatic motor driven transfer pumps and to route low pressure air to a plurality of other pneumatic motor driven transfer pumps so as to cause said one of the base component materials to be pumped at high pressure to said inlet means of one of said manifold modules while simultaneously other base component materials are pumped at low pressure to said inlet means of the manifold modules.

2. The apparatus of claim 1 in which each of said manifold modules includes a recirculation valve, and
   - said pneumatic logic circuit being operable to cause said recirculation valves to be positioned so that high pressure selected base component material is routed from its metering cylinder to said mixing means and low pressure unselected base component materials are routed from their respective metering cylinders back to their respective sources.

3. The apparatus of claim 2 in which each of said manifold modules includes a sample valve, and
   - said pneumatic logic circuit being operable to position said sample valves so that a selected base component material and the coreactant component material are simultaneously routed from their respective metering cylinders to a respective sample reservoir so as to enable the relative proportions of said selected base and coreactant component materials being pumped through said metering cylinders to be determined.

4. Apparatus for metering and mixing a plurality of flowable materials,
   - a pressurized source for each material,
   - an independent metering means for each material coupled with a pressurized source of said material through a passageway means,
   - mixing means including a mixing chamber operatively connected to each of said metering means through said passageway means,
   - each of said metering means including a metering cylinder having a double acting piston movable therein, a piston rod connected to said piston and projecting beyond an end wall of said metering cylinder,
   - pivotally mounted beam means connected to the piston rod of each of said metering means, said beam means being movable as a result of motive force imparted from said metering means,
   - isolating means for isolating one of said metering means for motive force contributions of the other metering means imparted through said beam means,
   - said isolating means comprising mechanical means for decoupling the motive force of one of said metering means from the motive force contribution of said other metering means, and
   - said mechanical means including at least one clutch.

5. Apparatus for metering and mixing a plurality of flowable materials,
   - a pressurized source for each material,
   - an independent metering means for each material coupled with a pressurized source of said material through a passageway means, mixing means including a mixing chamber operatively connected to each of said metering means through said passageway means, each of said metering means including a metering cylinder having a double acting piston movable therein, a piston rod connected to said piston and projecting beyond an end wall of said metering cylinder, pivotally mounted beam means connected to the piston rod of each of said metering means, said beams means being movable as a result of motive force imparted from said metering means, isolating means for isolating one of said metering means from motive force contributions of the other metering means imparted through said beam means, and said isolating means comprising at least one hydraulic by-pass valve and at least one hydraulic pressure reduction valve which reduces said motive force of said other metering means relative to the motive force of said selected one of said selected metering means so as to permit said selected one of said metering means to operate without a force contribution from said other metering means.

6. The apparatus of claim 5 wherein said isolating means comprises one hydraulic by-pass valve and one pressure reduction valve for each of said other metering means.

7. Apparatus for metering and mixing a plurality of flowable materials, a pressurized source for each material, an independent metering means for each material coupled with a pressurized source of said material through a passageway means, mixing means including a mixing chamber operatively connected to each of said metering means through said passageway means, each of said metering means including a metering cylinder having a double acting piston movable therein, a piston rod connected to said piston and projecting beyond an end wall of said metering cylinder, pivotally mounted beam means connected to the piston rod of each of said metering means, said beam means being movable as a result of motive force imparted from said metering means, isolating means for isolating one of said metering means from motive force contributions of the other metering means imparted through said beam means, and said isolating means comprising at least one pneumatic pressure reduction valve and at least one pneumatic selection valve which cooperates with pneumatic motor driven pumps of said plurality of flowable materials to supply said flowable materials to said other metering means at a reduced motive force relative to the motive force at which one of said flowable materials is supplied to said selected metering means.

8. The apparatus of claim 7 which includes at least one pneumatic selection valve for each of said other metering means.

* * * * *